US011721347B1

(12) United States Patent
Pasko et al.

(10) Patent No.: US 11,721,347 B1
(45) Date of Patent: Aug. 8, 2023

(54) INTERMEDIATE DATA FOR INTER-DEVICE SPEECH PROCESSING

(71) Applicant: Amazon Technologies, Inc., Seattle, WA (US)

(72) Inventors: Stanislaw Ignacy Pasko, Zawonia (PL); Pawel Zelazko, Gdansk (PL); Cagdas Bak, Gdansk (PL); Eli Joshua Fidler, Toronto (CA); Michal Kowalczuk, Gdansk (PL); Andrew Oberlin, Lynnwood, WA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 17/362,301

(22) Filed: Jun. 29, 2021

(51) Int. Cl.
*G10L 17/26* (2013.01)
*G10L 15/183* (2013.01)
*G10L 15/34* (2013.01)
*G10L 15/22* (2006.01)

(52) U.S. Cl.
CPC ............ *G10L 17/26* (2013.01); *G10L 15/183* (2013.01); *G10L 15/22* (2013.01); *G10L 15/34* (2013.01)

(58) Field of Classification Search
CPC ......... G10L 17/26; G10L 15/34; G10L 15/22; G10L 15/183
See application file for complete search history.

(56) References Cited

U.S. PATENT DOCUMENTS

| | | | | |
|---|---|---|---|---|
| 6,487,534 B1* | 11/2002 | Thelen | ............ | G10L 15/26 704/E15.047 |
| 9,454,957 B1* | 9/2016 | Mathias | ............ | G06F 40/295 |
| 2004/0078202 A1* | 4/2004 | Kamiya | ............ | G10L 15/30 704/E15.047 |
| 2006/0190268 A1* | 8/2006 | Wang | ............ | G10L 15/30 704/E15.047 |
| 2008/0120094 A1* | 5/2008 | Mate | ............ | G10L 15/30 704/E15.047 |
| 2011/0166851 A1* | 7/2011 | LeBeau | ............ | G10L 15/01 704/235 |
| 2012/0059658 A1* | 3/2012 | Sejnoha | ............ | G10L 15/26 704/E15.005 |
| 2012/0215528 A1* | 8/2012 | Nagatomo | ............ | G10L 15/187 704/211 |

(Continued)

*Primary Examiner* — Brian L Albertalli
(74) *Attorney, Agent, or Firm* — Pierce Atwood LLP

(57) ABSTRACT

Some speech processing systems may handle some commands on-device rather than sending the audio data to a second device or system for processing. The first device may have limited speech processing capabilities sufficient for handling common language and/or commands, while the second device (e.g., an edge device and/or a remote system) may call on additional language models, entity libraries, skill components, etc. to perform additional tasks. An intermediate data generator may facilitate dividing speech processing operations between devices by generating a stream of data that includes a first-pass ASR output (e.g., a word or sub-word lattice) and other characteristics of the audio data such as whisper detection, speaker identification, media signatures, etc. The second device can perform the additional processing using the data stream; e.g., without using the audio data. Thus, privacy may be enhanced by processing the audio data locally without sending it to other devices/systems.

20 Claims, 15 Drawing Sheets

(56) References Cited

U.S. PATENT DOCUMENTS

| | | | |
|---|---|---|---|
| 2015/0058018 A1* | 2/2015 | Georges | G10L 15/08 |
| | | | 704/257 |
| 2015/0242386 A1* | 8/2015 | Moreno Mengibar | ............ |
| | | | G06F 40/232 |
| | | | 704/235 |
| 2017/0186432 A1* | 6/2017 | Aleksic | G10L 15/07 |

* cited by examiner

FIG. 7
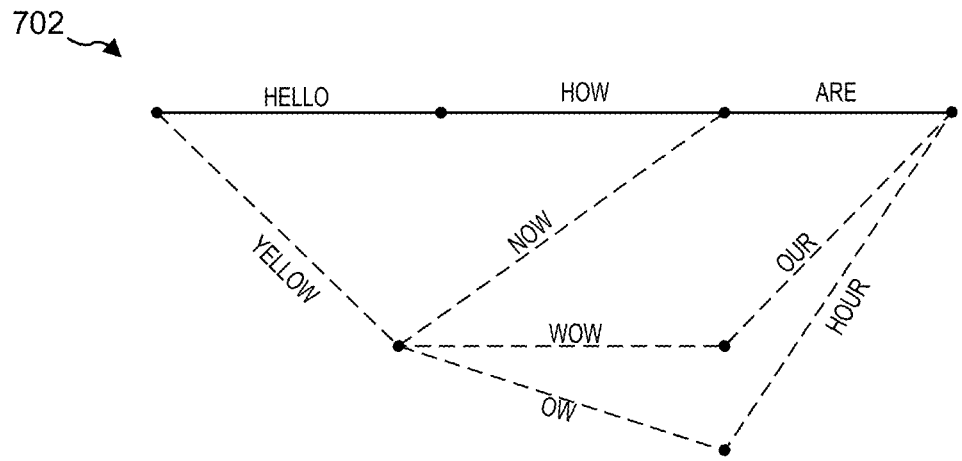
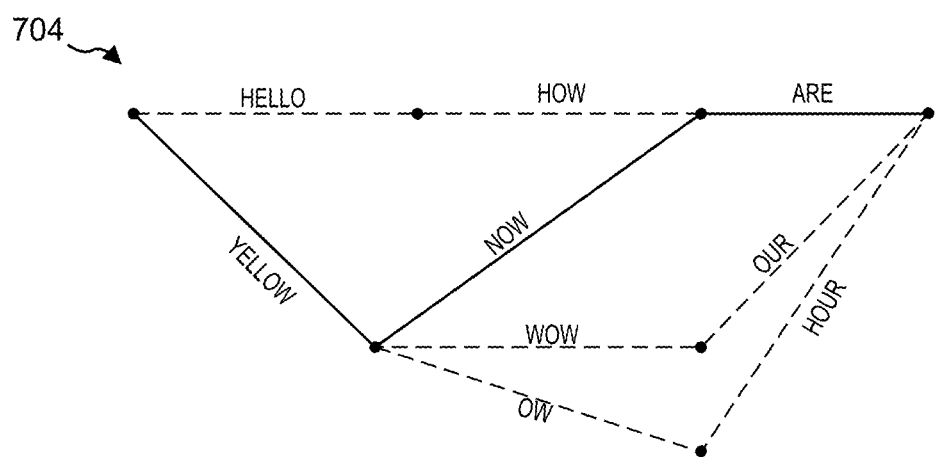
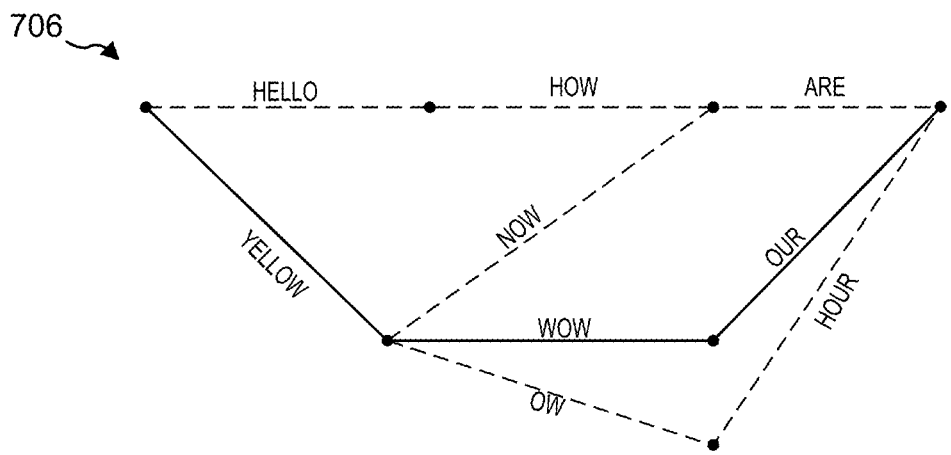

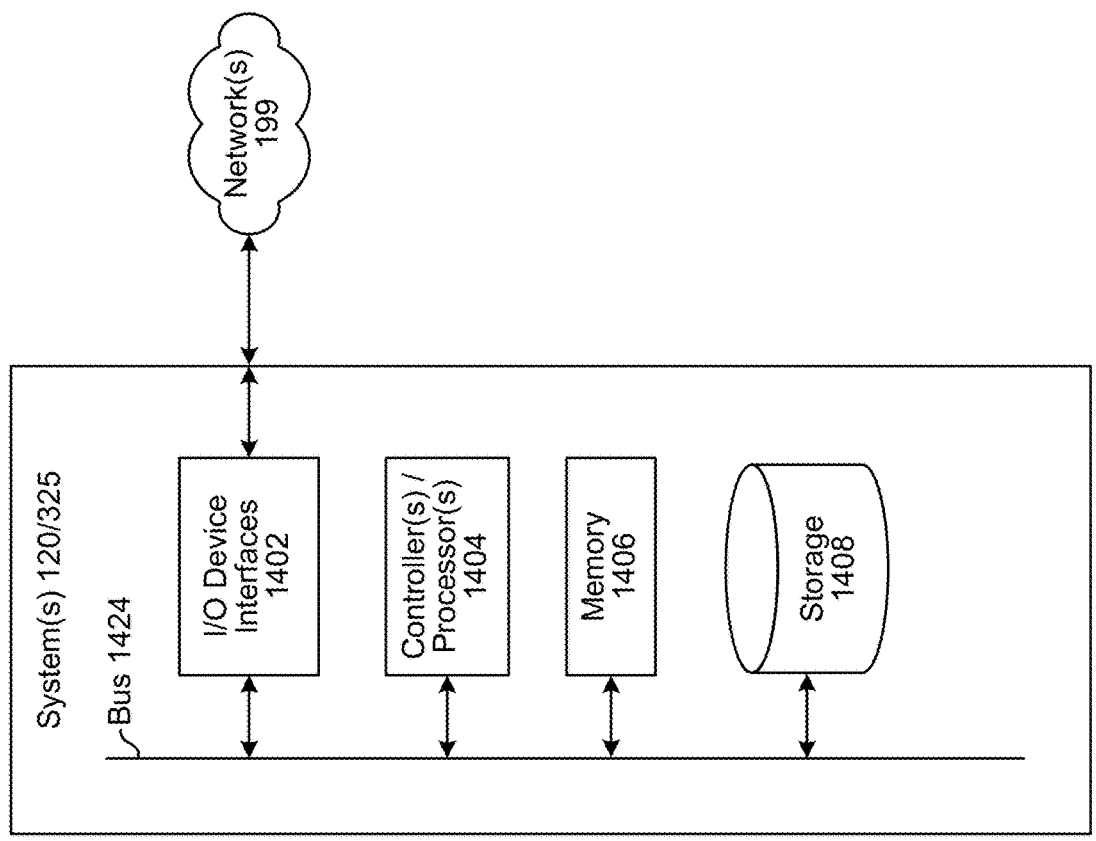

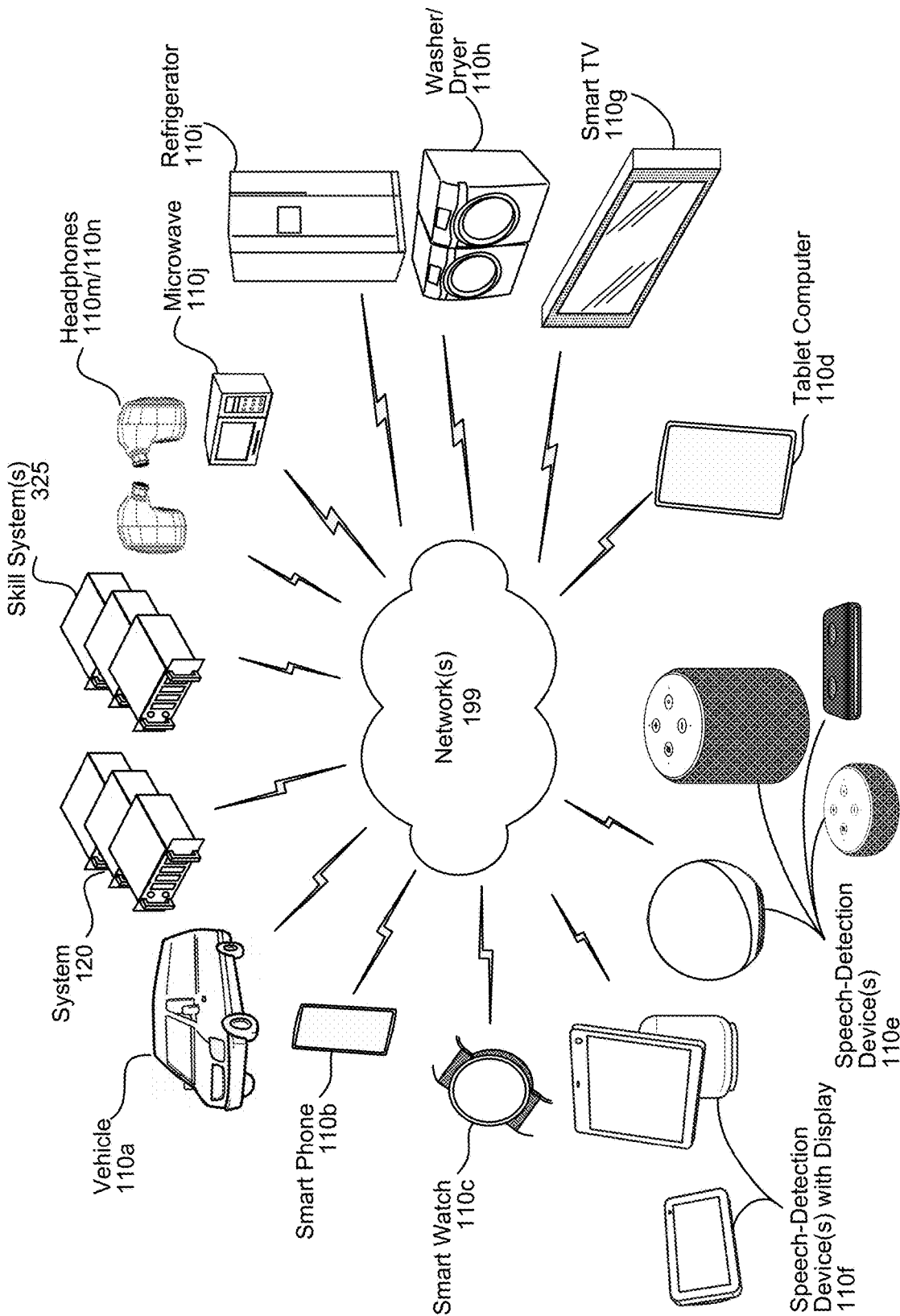

INTERMEDIATE DATA FOR INTER-DEVICE SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 illustrates speech recognition lattices according to one aspect of the present disclosure.

FIG. 14 is a block diagram conceptually illustrating example components of a system, according to embodiments of the present disclosure.

FIG. 15 illustrates an example of a computer network for use with the overall system, according to embodiments of the present disclosure.

DETAILED DESCRIPTION

Figure 1:
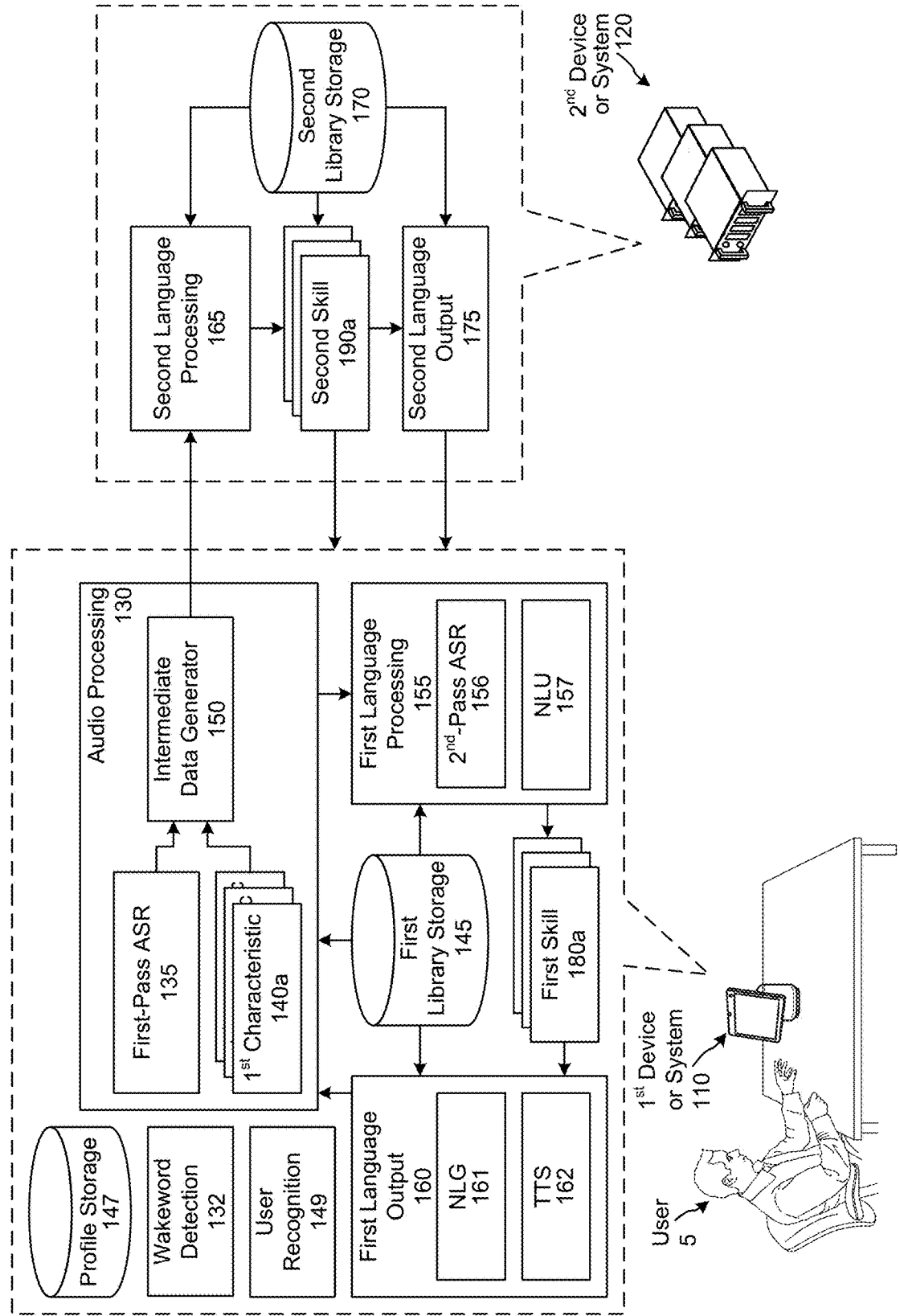
FIG. 1 is a conceptual diagram illustrating example components of a system for performing inter-device speech processing, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The virtual assistant can leverage the speech-processing system as well as additional applications and/or skills to perform tasks for and/or on behalf of the user.

Some speech processing systems may handle some commands on-device rather than sending the audio data to a second device or system for processing. The first device may have limited speech processing capabilities sufficient for handling some common language and/or commands, while the second device (e.g., an edge device and/or a remote system) may call on additional language models, entity libraries, skill components, etc. to perform additional tasks. In certain circumstances, however, the first device and a remote system may each perform certain processing to determine the best response to a natural language input from a user. To assist with coordinating such distributed processing an intermediate data generator may facilitate dividing speech processing operations between devices by generating a stream of data that includes a first-pass ASR output (e.g., a word or sub-word lattice) and other characteristics of the audio data such as whisper detection, speaker identification, false wakeword detection, etc. The second device can perform the additional processing using the data stream, e.g., without using the audio data. Thus, privacy may be enhanced by processing the audio data locally without sending it to other devices/systems.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating example components of a system 100 for performing inter-device speech processing, according to embodiments of the present disclosure. As shown in FIG. 1, the virtual assistant system 100 may include a first device or system 110 (hereafter "device 110") local to a user 5, and a second device or system 120

(hereafter "system 120") connected across one or more networks 199. The device 110 may be, for example, a user device such as a mobile device or speech-detection device. The system 120 may be a second device 110 and/or a home server system 120 within the home or within a local-area network with the device 110, and/or a remote server system 120 connected to the device 110 via the internet or other public and/or private data network. Although the figures and discussion of the present disclosure illustrate certain steps in a particular order, the steps described may be performed in a different order (as well as certain steps removed or added) without departing from the present disclosure.

The device 110 may receive input from the user 5 including audio 11 corresponding to an utterance (e.g., a spoken natural language input). The device 110 may process audio following detection of a wakeword and/or detection of another indication to begin receiving input; for example, a gesture such as a button press. The device 110 may generate audio data corresponding to the audio 11, and may process the audio data locally and/or send data (e.g., intermediate speech processing data) to the system 120 for processing. The device 110 may send the audio data to the system 120 via an application installed on the device 110 and associated with the system 120. An example of such an application is the Amazon Alexa application that may be installed on a smart phone, tablet, or the like. In some implementations, the device 110 may receive and/or generate various forms of input such as audio data, text data, and/or image data. The device 110 may process inputs locally and/or request additional processing from the system 120. The device 110 (and/or other devices 110) may respond by performing an action responsive to the audio, such as such as outputting synthesized speech or doing something in the physical world such as actuate a car window or a house light. Examples of various devices 110 are described with reference to FIG. 15, and hardware of an example device 110 is described with reference to FIG. 13. The system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110). System 120 may also include some combination thereof, for example where certain components/operations are performed via a home server(s) and others are performed via a geographically remote server(s). An example system 120 is described with reference to FIG. 14.

The device 110 may include the components as shown in FIG. 1, including audio processing components 130, first language processing components 155, one or more first skill components 180a, 180b, and 180c (collectively, "first skill components 180"), and first language output components 160. The various components of the device 110 may leverage various default and/or personalized models and/or libraries stored in the on-device library storage 145. Examples of data stored in the on-device library storage 145 may include, for example and without limitation, one or more first-pass ASR models (e.g., acoustic and/or language models), one or more wakeword detection models, one or more acoustic event detection (AED) models, one or more intent libraries for NLU, and/or one or more entity libraries for entity resolution (ER).

The audio processing components 130 may include a first-pass ASR component 135, one or more audio data processing components 140, and an intermediate data generator 150. The one or more audio data processing components 140 that may determine, detect, and/or identify various a characteristic of the audio data. For example, a first component 140a may determine a first characteristic, a second component 140b may determine a second characteristic, and a third component 140c may determine a third characteristic, etc. The audio data characteristics determined by the audio data processing components 140 may include, for example and without limitation, a false wakeword detection event (e.g., detecting a representation of a wakeword in audio output by a speaker of a device such as a television, radio, etc.), a speaker identifier corresponding to speech detected in the audio 11, a whisper detection event, wakeword verification, an AED event, echo-spatial perception (ESP), etc. Example audio data processing components 140 are described in further detail below with reference to the audio data processing components 905. The first-pass ASR component 135 may receive the audio data and process it with a recurrent neural network transducer (RNN-Ts) to generate a first-pass ASR output. In some implementations, the first-pass ASR component 135 may additionally or alternatively include one or more acoustic models, finite-state transducers (FSTs), and/or language models. The first-pass ASR output may include one or more ASR hypotheses representing possible transcriptions of speech represented in the audio data. The first-pass ASR output may be in the form of a graph that map words, subwords, and/or word sequences with corresponding probabilities; e.g., a word lattice or subword lattice. ASR processes are discussed in additional detail below with reference to FIG. 4, and word/subword lattices are discussed in additional detail below with reference to FIGS. 5 through 8.

The intermediate data generator 150 may combined the outputs of the first-pass ASR component 135 and the audio data processing components 140 into intermediate data such as an intermediate data stream for sending to the system 120. For example, the outputs of each component 135 and/or 140 may be a respective logical bitstream. The intermediate data generator 150 may multiplex the various logical bitstreams into a single physical bitstream. On the system 120 side, the physical bitstream may be demultiplexed and distributed to various consumers of the data including the second language processing components 165. A bitstream may be, for example, a plurality of pages and/or packets of data generated according to a communication protocol for communication between components, devices, and/or systems. A logical bitstream may represent a plurality of data packets originating at a sources; e.g., the first-pass ASR component 135 and/or an audio data processing component 140. The intermediate data generator 150 may combine the data packets from various sources into a single data stream (e.g., the intermediate data) that may include header and/or comment information for data from respective sources. The intermediate data may include and/or refer to various data corresponding to a single utterance; for example, a plurality of first-pass ASR hypotheses and one or more characteristics of the audio data. Thus, one or more receiving components, devices, and/or systems may process the data with reference to, for example, a particular user ID, speaker ID, utterance ID, and/or dialog session. The intermediate data generator 150 is described in additional detail below with reference to FIG. 9, and an example data stream is described with reference to FIG. 10.

While the device 110 may send the first-pass ASR output to the system 120 via the intermediate data generator 150, the device 110 may process (or attempt to process) the first-pass ASR output on-device; for example, using the first language processing components 155. The first language processing components 155 may include additional ASR processing of the first-pass ASR output such as ASR lattice processing, NLU, and/or entity resolution using one or more models and/or libraries stored in the on-device library storage 145. The first language processing components 155 may output NLU results data in the form of one or more ranked NLU hypotheses. An NLU hypothesis may include an intent and/or an entity representing a command in the received speech. If the intent/entity is recognized by the device and corresponds to a first skill component 180, the device 110 may send a skill request to the appropriate first skill component 180 for executing the command. NLU processing and entity resolution are described in additional detail below with reference to FIGS. 11 and 12.

A first skill component 180 may receive a request and perform an action, such as generating a response and/or doing something in the physical environment. Example skills that may reside on the device 110 may include a weather skill, a smart home skill (e.g., for controlling environmental controls such as a smart thermostat), an auto skill (e.g., for controlling windows/locks of a vehicle), a media skill for controlling a nearby television, etc. In some cases, the first skill component 180 may return a directive to the device 110. The directive may instruct the device 110 to perform an action, such as generating an output. In some cases, the directive may correspond to a response to be delivered to the user in the form of synthesized speech. The first skill component 180 may thus send the response data to the first language output components 160.

The first language output components 160 may include components for natural language generation (NLG) and/or text-to-speech (TTS). The first language output components 160 may receive a directive from, for example, a first skill component 180, and generate speech to output audibly to the user. The first language output components 160 may generate the natural language spoken output, which the device 110 may output using a speaker. These and other components of the device 110 are described in additional detail below with reference to FIG. 4.

While the first device or system 110 may have limited speech processing capabilities sufficient for handling common language and/or commands, in some cases, the second device or system 120 may have additional language processing and/or skill capabilities. Thus, while the device 110 is processing the first-pass ASR output, the system 120 may receive and attempt to process the intermediate data received via the intermediate data generator. This may result in duplicate execution. For example, both a first skill component 180 of the device 110 and the system 120 may return directives corresponding to the command. The device 110 may, however, maintain state information regarding each command received (e.g., a dialog session) and may thus be able to discard a later-received, redundant directive for a command. In addition, the device 110 may include other components for processing audio and/or enhancing privacy. For example, the first-pass ASR components 135 ad/or the audio data processing components 140 may include wakeword verification and/or endpoint detection capabilities. The device 110 may perform additional processing on received audio data and verify that that the detected wakeword was indeed present in the audio data. Similarly, the device 110 may detect when a user has ended an utterance; for example, by detecting a no speech for a period of time (e.g., from several hundred milliseconds to a second or two). In the event the device 110 is unable to verify the wakeword and/or detects an endpoint, the device 110 may stop capturing audio and/or cease sending intermediate data to the system 120.

The system 120 may include the components as shown in FIG. 1, including second language processing components 165, second skill components 190*a*, 190*b*, and 190*c*, etc. (collectively, "second skill components 190"), and second language output components 175. The various components of the system 120 may leverage models and/or libraries stored in a second library storage 170. Examples of data stored in the second library storage 170 may include, for example and without limitation, one or more language models for ASR, one or more intent libraries for NLU, and/or one or more entity libraries for entity resolution (ER). These models and/or libraries may be more extensive than those in the on-device library storage 145. Accordingly, the system 120 may be able to process more complex language and recognize more entities than the device 110. In addition, the system 120 may include more and/or more powerful second skill components 190 that, for example, may be able to execute with respect to a broader range of intents/commands than the device 110. In some cases, the components of the system 120 may be able to process speech and execute a command faster than the device 110; while in other cases, processing the commands locally on the device 110 may eliminate delay due to sending intermediate data to, and receiving output data from, the system 120. Thus, buy attempting speech processing and command execution both on the device 110 and at the system 120, the system 100 can reduce latency in many cases.

The system 120 may receive the intermediate data from the device 110 and distributed portions of the intermediate data to the various consumers of the data. For example, the system 120 may send the first-pass ASR output to the second language processing components 165 for second ASR processing (e.g., lattice processing using additional language models), NLU, and/or entity resolution. Similar to the first language processing components 155, the second language processing components 165 may output NLU results data in the form of one or more ranked NLU hypotheses. An NLU hypothesis may include an intent and/or an entity representing a command in the received speech. The system 120 may send a skill request corresponding to the intent and/or entity to the appropriate second skill component 190 for executing the command. NLU processing and entity resolution are described in additional detail below with reference to FIGS. 11 and 12.

A second skill component 190 may receive a request and perform an action, such as generating a response and/or doing something in the physical environment. The second skill components 190 of the device 120 may represent a more extensive range of services than, for example, the first skill components 180. Example skills that may reside on, or connect to, the system 120 may include skills for shopping, streaming media, and/or productivity applications such as an online calendar. In some cases, the second skill component 190 may return a directive to the device 110. The directive may instruct the device 110 to perform an action, such as generating an output. In some cases, the directive may correspond to a response to be delivered to the user in the form of synthesized speech. In such cases, the second skill component 190 may send the response data to the second language output components 175.

The second language output components 175 may include components for natural language generation (NLG) and/or text-to-speech (TTS). The second language output components 175 may receive a directive from, for example, a second skill component 190, and generate speech to output audibly to the user. The second language output components 175 may send a natural language spoken output to the device 110 for output using a speaker. These and other components of the system 120 are described in additional detail below with reference to FIG. 3.

In an example operation, the device 110 may receive input from the user 5 including audio corresponding to an utterance (e.g., a spoken natural language input). The device 110 may process audio following detection of a wakeword detected by the wakeword detection component 132. The device 110 may generate audio data corresponding to the audio, and may process the audio data locally and/or send intermediate data to the system 120. The device 110 may send the data to the system 120 via a client application that is installed on the device 110 and which may be associated with the system 120. An example of such a client application is the Amazon Alexa application that may be installed on a smart phone, tablet, or the like. Upon detecting a wakeword, the client application may begin generating audio data corresponding to audio captured by the microphone. In some implementations, the client application may receive other indications to capture audio data; for example, a button press. The client application may send data such as audio data to the audio processing components 130 for processing. The device 110 may process results of the audio processing locally (e.g., using the first language processing components 155) and/or send the results to the remote system 120 for processing. The client application may receive responsive data (e.g., one or more directives) from components of the device 110 and/or the system 120, and perform one or more actions such as outputting synthesized speech or doing something in the physical world such as actuate a car window or a house light.

The device 110 may perform first-pass ASR processing of the audio data using the first-pass ASR component 135. The output of the first-pass ASR component 135 may be, for example, one or more first-pass ASR hypotheses representing possible transcriptions or partial transcriptions of the speech in the audio data; for example, in the form of a word lattice or sub-word lattice. The system 100 may process or attempt to process the first-pass ASR hypotheses both on the device 110 and/or the system 120. The system 100 may perform speech processing in various modes. For example, in an offline mode, the device 110 may lack a reliable network connection to the system 120, and may thus attempt to process all speech and execute all command on the device 110, returning an error if processing and/or execution is not possible. In a hybrid mode, the device 110 may attempt to process audio locally while also sending the audio data to the system 120 for processing. In a privacy mode, the device 110 may not send any audio data to other devices or systems; rather, the device 110 may process the audio data locally and send only intermediate data (e.g., the first-pass ASR hypotheses and output of the one or more audio data processing components 140) to another device or system.

For on-device processing, the device 110 may send the first-pass ASR hypotheses to the first language processing components 155, which may include a second-pass ASR component 156 and a first NLU component 157. The device 110 may conduct its own speech processing using the second-pass ASR component 156 and a first NLU component 157, similar to the manner discussed herein with respect to the second language processing components 165 (or ASR component 350 and the NLU component 360) of the system 120. In some implementations, the second-pass ASR component 156 and/or the first NLU component 157 may use different models and/or libraries from the ASR and NLU components of the second device. For example, the second-pass ASR component 156 and/or the first NLU component 157 may use libraries/models that emphasize and/or are limited to language related to commands executable by the device (e.g., using the first skill components 180 and/or hardware capabilities of the device 110 or other devices linked or otherwise under the control of the device 110). The device 110 may also internally include, or otherwise have access to, other components such as one or more first skill components 180 capable of executing commands based on NLU results data or other results determined by the device 110/system 120 (which may operate similarly to second skill components 190). Similar to as described above with respect to second skill component 190, a first skill component 180 may communicate with a skill support system(s) 325. The device 110 may further include first language output components 160, which may include NLG component 161 and TTS component 162. The first language output components 160 may operate similarly to second language output components 175, NLG component 161 may operate similarly to NLG component 379 and TTS component 162 may operate similarly to TTS component 380 as described in further detail below with reference to FIG. 3.

In at least some embodiments, the device 110 may include, or be configured to use, one or more first skill components 180 that may work similarly to the second skill component(s) 190 implemented by the system 120. The first skill component(s) 180 may correspond to one or more domains that are used in order to determine how to act on a spoken input in a particular way, such as by outputting a directive that corresponds to the determined intent, and which can be processed to implement the desired operation. The first skill component(s) 180 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, one or more of the first skill components 180 may be in communication with one or more skill support systems, such as the skill support systems 325 described below with reference to FIG. 3. For example, a skill support system may be located in a remote environment (e.g., separate location) such that the device 110 may only communicate with the skill support system via the network(s) 199. However, the disclosure is not limited thereto. For example, in at least some embodiments, a skill support system may be configured in a local environment (e.g., home server and/or the like) such that the device 110 may communicate with the skill support system via a private network, such as a local area network (LAN).

As used herein, a "skill" may refer to a first skill component 180, a skill support system 325, or a combination of a skill component 180 and a corresponding skill support system 325. Similar to the manner discussed with regard to FIG. 3, the first device 110 may be configured to recognize multiple different wakewords and/or perform different categories of tasks depending on the wakeword. Such different wakewords may invoke different processing components of first device 110 (not illustrated in FIG. 1). For example, detection of the wakeword "Alexa" by the wakeword detection component 132 may result in sending audio data to certain first language processing components 155/first skill components 180 for processing while detection of the wakeword "Computer" by the wakeword detector may result in sending audio data different first language processing components 155/first skill components 180 for processing.

In at least some embodiments, the first language processing components 155 and/or first skill components 180 of the device 110 may not have the same capabilities as those of the system 120. For example, the on-device language processing components may be configured to handle only a subset of the natural language user inputs representing, for example, common language and/or commands that may be handled by the system 120. Such subset of natural language user inputs may correspond to local-type natural language user inputs, such as those controlling devices or components associated with a user's home. In such circumstances the first language processing components 155 may be able to more quickly interpret and respond to a local-type natural language user input than, for example, transmitting data to and from the system 120 and processing the data there. If, however, the device 110 attempts to process a natural language user input for which the first language processing components 155 are not necessarily best suited, the language processing results determined by the device 110 may indicate a low confidence or other metric indicating that the processing by the device 110 may not be as accurate as the processing done by the system 120. In some cases, the device 110 components may be able to identify a command (e.g., an intent and/or entity in NLU results data) with a reasonable level of confidence, but nevertheless lack a first skill component 180 capable of executing with respect to the identified command. Accordingly, the device 110 may await a response from the system 120.

The device 110 and/or the system 120 may associate a unique identifier with each natural language user input. The device 110 may include the unique identifier when sending the intermediate data to the system 120, and the response data from the system 120 may include the unique identifier to identify which natural language user input the response data corresponds. Thus, in operating modes where the system 100 processes or attempts to process commands both on the device 110 and on the system 120, the device 110 may monitor for duplicate directives (e.g., when both the device components and the system 120 both process the command and return a response), and discard a later-received response; for example, by ignoring or suppressing it.

The device 110 may include profile storage 147 for storing a variety of information related to individual users, groups of users, devices, etc. that interact with the system. The profile storage 147 may be similar to, for example, the profile storage 370 of the remote system 120 described below with reference to FIG. 3, but perhaps storing a subset of profiles registered with and/or relevant to the device 110. Components of the device 110 may retrieve profile information from the profile storage 147 based on, for example, a user identifier and/or a speaker identifier as determined by the user-recognition component 149.

The device 110 (and/or the system(s) 120) may include a user-recognition component 149 that recognizes one or more users using a variety of data including, for example, a speaker identifier and/or other feature data determined by one or more of the audio data processing components 140. The user-recognition component 149 may take as input the audio data and/or characteristic data output by, for example, one of the audio data processing components 140. Speaker identification as performed by the audio processing components 130 is described below with reference to FIG. 9. The output of the user-recognition component 149 may be used to, for example, identify one or more user-specific models or libraries for use in processing user speech by, for example, the first language processing components 155 and/or the second language processing components 165.

The user-recognition component 149 may perform user recognition by comparing audio characteristics in the audio data to stored audio characteristics of users. The user-recognition component 149 may also perform user recognition by comparing biometric data (e.g., fingerprint data, iris data, etc.), received by the system in correlation with the present user input, to stored biometric data of users assuming user permission and previous authorization. The user-recognition component 149 may further perform user recognition by comparing image data (e.g., including a representation of at least a feature of a user), received by the system in correlation with the present user input, with stored image data including representations of features of different users. The user-recognition component 149 may perform additional user recognition processes, including those known in the art.

The user-recognition component 149 may determine one or more scores indicating whether user input originated from a particular user. For example, a first score may indicate a likelihood that the user input originated from a first user, a second score may indicate a likelihood that the user input originated from a second user, etc. The user-recognition component 149 may also determine a score representing an overall confidence regarding the accuracy of user recognition operations.

Output of the user-recognition component 149 may include a single user identifier corresponding to the most likely user that originated the user input. Alternatively, output of the user-recognition component 149 may include an N-best list of user identifiers with respective scores indicating likelihoods of respective users originating the user input. The output of the user-recognition component 149 may be used to inform NLU processing as well as processing performed by other components of the system.

Figure 2:
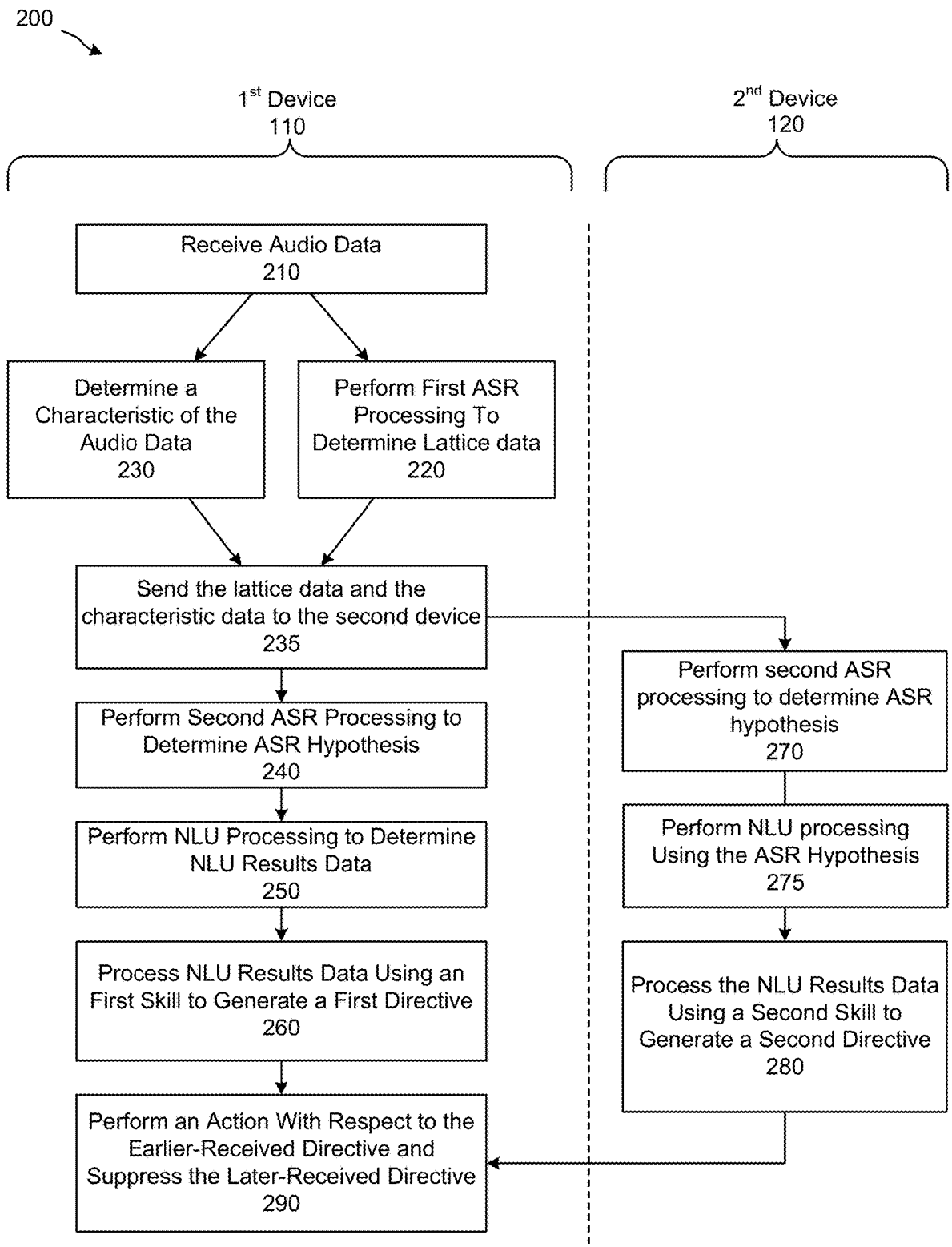
FIG. 2 is a flowchart illustrating example operations of a method of inter-device speech processing, according to embodiments of the present disclosure.

FIG. 2 is a flowchart illustrating example operations of a method 200 of inter-device speech processing, according to embodiments of the present disclosure. The method 200 may be performed by components of the first device or system 110 in conjunction with the second device or system 120. The method 200 may include receiving (210) audio data representing, for example, audio captured by a microphone of the device 110 following detection of a wakeword or other indication to begin capturing audio. The audio data may represent an utterance spoken (or whispered) by the user.

The method 200 may include performing (220) performing first-pass ASR processing of the audio data to determine lattice data representing, for example, one or more word lattices representing possible transcriptions of speech in the received audio data. The first device 110 may perform the first-pass ASR processing using a first ASR component of the first device. The first ASR component may output the lattice data representing possible word/subword sequences associated with probabilities. At least partially in parallel with the stage 220, the method 200 may include performing (230) audio processing on the audio data using an audio processing component of the first device to determine characteristic data of the audio data. The characteristic data may include, for example, a speaker identifier corresponding to data speaker of the utterance, a whisper detection signal indicating that the audio data includes whispered speech, or a false wakeword detection event indicating that a representation of a wakeword in the audio data was output by a speaker of the device 110 or another nearby device such as a television, radio, etc.

The method 200 may include sending (235) intermediate data representing the lattice data and the characteristic data to the second device 120. An intermediate data generator of the first device 110 may join the lattice and the characteristic data into a single stream of data—e.g., the intermediate data—that may include combined word lattice(s) and/or characteristic data corresponding to a single utterance. Thus, one or more receiving components (e.g., of the second device 120) may process the intermediate data with reference to, for example, a particular user ID, speaker ID, utterance ID, and/or dialog session. The device 110 may continue to stream intermediate data to the system 120 as further audio data is received and processed by the first-pass ASR component 135 and/or the audio data processing components 140. Operations of the intermediate data generator are detailed below with reference to FIG. 9, and an example intermediate data is detailed below with reference to FIG. 10.

The method 200 may include performing (240) second ASR processing on the plurality of the lattice data using a second ASR component of the first device to determine one or more ASR hypotheses corresponding to the utterance. The second ASR processing may include lattice processing using additional models to rerank, refine, and/or prune the plurality of ASR hypotheses to determine a single ASR hypothesis or multiple ranked ASR hypotheses. The second ASR processing may additionally include confidence estimation (e.g., an estimated probability that an ASR hypothesis is correct) and/or device directedness estimation (e.g., an estimated probability that speech represented in an ASR hypothesis was directed to the device 110 rather than, for example, another nearby person).

The method 200 may include performing (250) natural language understanding (NLU) processing on the best ASR hypothesis using an NLU component of the first device 110 to generate NLU results data. The NLU results data may include an intent and/or an entity. The first device 110 may identify a first skill component for executing commands corresponding to the intent and/or entity. The method 200 may include processing (260) at least a portion of the NLU results data using a first skill component (e.g., of the first device 110) to generate a first directive.

The method 200 may include performing (270) second ASR processing of the plurality of lattice data on the second device 120 to generate one or more ASR hypotheses. The second ASR processing of the stage 270 may include, for example, second ASR processing such as that performed by the first device 110 at the stage 240. The method 200 may include performing (275) NLU processing such as that performed by the first device 110 at the stage 250 to generate NLU results data. The method 200 may include processing (280) the NLU results data generated at the stage 275 using a second skill (e.g., of the second device 120) to generate a second directive.

The method 200 may include receiving, by the first device 110, the second directive from the second device 120. The speech and command processing operations of stages 270 and 280 may occur during one or more time periods that overlap with operations occurring on the first device 110; for example, stages 240, 250, and/or 260. In some cases, processing may occur faster/slower on the second device 120 with respect to the processing on the first device 110. In some cases, latency of data transmission between the first device 110 and the second device 120 may affect latency between transmission of data at the stage 235 and the receipt of the second directive. The first device 110 may this respond to the first directive received, and ignore any subsequent directives corresponding to the utterance. Thus, the method 200 may include performing (290) an action with respect to the earlier-received directive and suppressing the later received directive. The action may include, for example, outputting a response in the form of synthesized speech and/or doing something in the physical world.

Although the FIG. 2 illustrates certain stages/steps in a particular order, the steps described may be performed in a different order and/or during overlapping time periods (as well as certain steps removed or added) without departing from the present disclosure.

Figure 3:
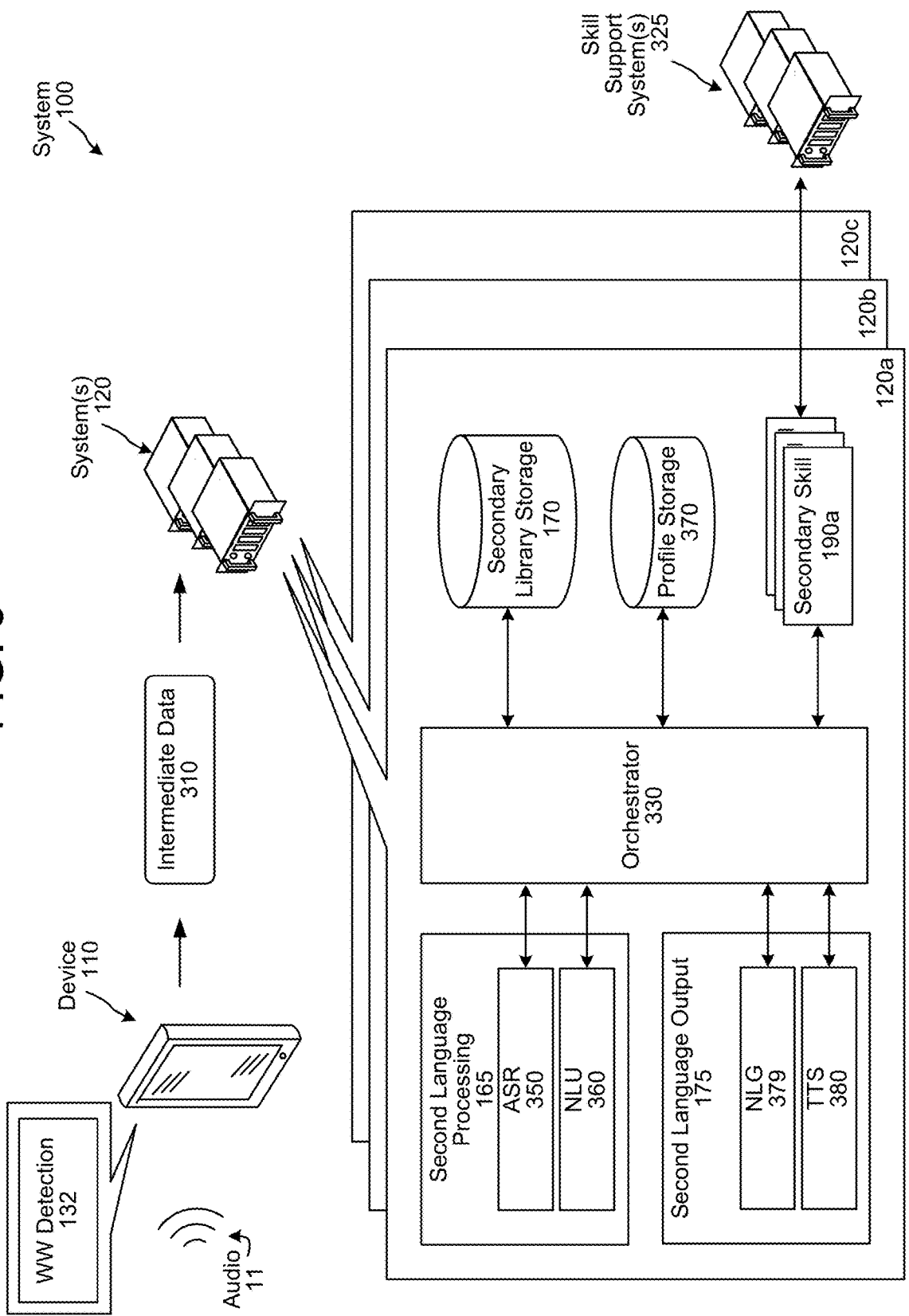
FIG. 3 is a conceptual diagram of components of the system, according to embodiments of the present disclosure.

FIG. 3 is a conceptual diagram of components of the system 120, according to embodiments of the present disclosure. The system 120 may include the second language processing components 165, second language output components 175, second library storage 170, and second skill components 190 previously described. The second language processing components 165 may include an ASR component 350 and NLU component 360. The second language output components may include an NLG component 379 and a TTS component 380. The system 120 may also include a profile storage 370, described in further detail below.

Operations of the remote system 120 may begin when the device 110 detects a wakeword or other indication to receive data; for example, a button press indicating an invocation of a virtual assistant, etc. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 132. The wakeword detection component 132 may be configured to detect various wakewords. In at least some examples, each wakeword may correspond to a name of a different digital assistant. An example wakeword/digital assistant name is "Alexa." Once activated by wakeword and/or gesture, etc., the device 110 may capture the audio 11, generate audio data, and process the audio data as described in FIG. 1 to generate intermediate data 310 for sending to the system 120. In some implementations, of the device 110 may receive text data, for example as a result of a user typing an input into a user interface of device 110, and send the text data to the system 120. The device 110 may capture images using camera(s) 1318 of the device 110 and may send image data representing those image(s) to the system 120. The image data may include raw image data or image data processed by the device 110 before sending to the system 120.

The wakeword detection component 132 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 132 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 132 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 132 and/or input is detected by an input detector, the device 110 may "wake" and begin transmitting audio data, representing the audio 11, to the system(s) 120. The audio data may include data corresponding to the wakeword; in other embodiments, the portion of the audio corresponding to the wakeword is removed by the device 110 prior to sending the audio data to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 132 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 190 of one or more systems 120.

Upon receipt by the system(s) 120, the audio data may be sent to an orchestrator component 330. The orchestrator component 330 may include memory and logic that enables the orchestrator component 330 to transmit various pieces and forms of data to various components of the system, as well as perform other operations as described herein.

The orchestrator component 330 may send the audio data to the second language processing components 165. The second language processing components 165 (sometimes also referred to as a spoken language understanding (SLU) component) includes an automatic speech recognition (ASR) component 350 and a natural language understanding (NLU) component 360. The ASR component 350 may transcribe the audio data into text data. The text data output by the ASR component 350 represents one or more than one (e.g., in the form of an N-best list) ASR hypotheses representing speech represented in the audio data. The ASR component 350 interprets the speech in the audio data based on a similarity between the audio data and pre-established language models. For example, the ASR component 350 may compare the audio data with models for sounds (e.g., acoustic units such as phonemes, senons, phones, etc.) and sequences of sounds to identify words that match the sequence of sounds of the speech represented in the audio data. The ASR component 350 sends the text data generated thereby to an NLU component 360, via, in some embodiments, the orchestrator component 330. The text data sent from the ASR component 350 to the NLU component 360 may include a single top-scoring ASR hypothesis or may include an N-best list including multiple top-scoring ASR hypotheses. An N-best list may additionally include a respective score associated with each ASR hypothesis represented therein. The ASR component 350 is described in greater detail below with regard to FIG. 4.

In some cases, ASR processing may be split between the device 110 and the system 120. Thus, the device 110 may perform first-pass ASR processing, and the system 120 may receive the intermediate data from the device 110 and perform second ASR processing. The intermediate data may therefore include, for example, first-pass ASR hypotheses. The first-pass ASR hypotheses may include or be in the form of, for example, a word lattice or subword lattice that associated possible sequences of words/subwords with probability scores. The ASR component 350 may thus perform second processing of the ASR data to determine second ASR hypotheses. The second ASR processing may include, for example, lattice processing. The second ASR processing may leverage a larger and more extensive language model or multiple language models to refine the first-pass ASR hypotheses. The second ASR processing may include, for example, rescoring, reranking, and/or pruning of the first-pass ASR hypotheses and/or augmenting the first-pass ASR hypotheses with additional hypotheses to generate the second plurality of ASR hypotheses. The first-pass and second ASR processing are described in greater detail below with regard to FIG. 4.

The second language processing components 165 may further include an NLU component 360. The NLU component 360 may receive the text data from the ASR component. The NLU component 360 may attempts to make a semantic interpretation of the phrase(s) or statement(s) represented in the text data input therein by determining one or more meanings associated with the phrase(s) or statement(s) represented in the text data. The NLU component 360 may determine an intent representing an action that a user desires be performed and may determine information that allows a device (e.g., the device 110, the system(s) 120, a skill component 190, a skill support system(s) 325, etc.) to execute the intent. For example, if the text data corresponds to "play the $5^{th}$ Symphony by Beethoven," the NLU component 360 may determine an intent that the system output music and may identify "Beethoven" as an artist/composer and "5th Symphony" as the piece of music to be played. For further example, if the text data corresponds to "what is the weather," the NLU component 360 may determine an intent that the system output weather information associated with a geographic location of the device 110. In another example, if the text data corresponds to "turn off the lights," the NLU component 360 may determine an intent that the system turn off lights associated with the device 110 or the user 5. However, if the NLU component 360 is unable to resolve the entity—for example, because the entity is referred to by anaphora such as "this song" or "my next appointment"— the second language processing components 165 can send a decode request to another second language processing components 165 for information regarding the entity mention and/or other context related to the utterance. The second language processing components 165 may augment, correct, or base results data upon the audio data as well as any data received from the other second language processing components 165.

The NLU component 360 may return NLU results data 1285/1225 (which may include tagged text data, indicators of intent, etc.) back to the orchestrator component 330. The orchestrator component 330 may forward the NLU results data to a second skill component(s) 190. If the NLU results data includes a single NLU hypothesis, the NLU component 360 and the orchestrator component 330 may direct the NLU results data to the skill component(s) 190 associated with the NLU hypothesis. If the NLU results data 1285/1225 includes an N-best list of NLU hypotheses, the NLU component 360 and the orchestrator component 330 may direct the top scoring NLU hypothesis to a skill component(s) 190 associated with the top scoring NLU hypothesis. The system may also include a post-NLU ranker which may incorporate other information to rank potential interpretations determined by the NLU component 360. The first device 110 may also include its own post-NLU ranker, which may operate similarly to the post-NLU ranker of the remote system 120. The NLU component 360, post-NLU ranker and other components are described in greater detail below with regard to FIGS. 11 and 12.

A skill component, such as the second skill components 190, may be software running on the system(s) 120 that is akin to a software application. That is, a skill component 190 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 190. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pi8 with respect to the restaurant's online ordering system, etc. A skill component 190 may operate in conjunction between the system(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 325 may communicate with a second skill component(s) 190 within the system(s) 120 and/or directly with the orchestrator component 330 or with other components. A skill support system(s) 325 may be configured to perform one or more actions. An ability to perform such action(s) may sometimes be referred to as a "skill." That is, a skill may enable a skill support system(s) 325 to execute specific functionality in order to provide data or perform some other action requested by a user. For example, a weather service skill may enable a skill support system(s) 325 to provide weather information to the system(s) 120, a car service skill may enable a skill support system(s) 325 to book a trip with respect to a taxi or ride sharing service, an order pi8 skill may enable a skill support system(s) 325 to order a pi8 with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 190 dedicated to interacting with the skill support system(s) 325. Unless expressly stated otherwise, reference to a skill, skill device, or skill component may include a skill component 190 operated by the system(s) 120 and/or skill operated by the skill support system(s) 325. Moreover, the functionality described herein as a skill or skill may be referred to using many different terms, such as an action, bot, app, or the like. The skill component 190 and or skill support system(s) 325 may return output data to the orchestrator component 330.

The system 120 may include second language output components 175. The second language output components 175 may include a natural language generation (NLG) component 379 and a text-to-speech (TTS) component 380. The NLG component 379 can generate text for purposes of TTS output to a user. For example the NLG component 379 may generate text corresponding to instructions corresponding to a particular action for the user to perform. The NLG component 379 may generate appropriate text for various outputs as described herein. The NLG component 379 may include one or more trained models configured to output text appropriate for a particular input. The text output by the NLG component 379 may become input for the TTS component 380 (e.g., output text data discussed below). Alternatively or in addition, the TTS component 380 may receive text data from a skill component 190 or other system component for output.

The NLG component 379 may include a trained model. The NLG component 379 generates text data from dialog data received by the dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 380.

The TTS component 380 may generate audio data (e.g., synthesized speech) from text data using one or more different methods. Text data input to the TTS component 380 may come from a skill component 190, the orchestrator component 330, or another component of the system. In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The system 100 (either on device 110, system 120, or a combination thereof) may include profile storage 370 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 370 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 370 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 4:
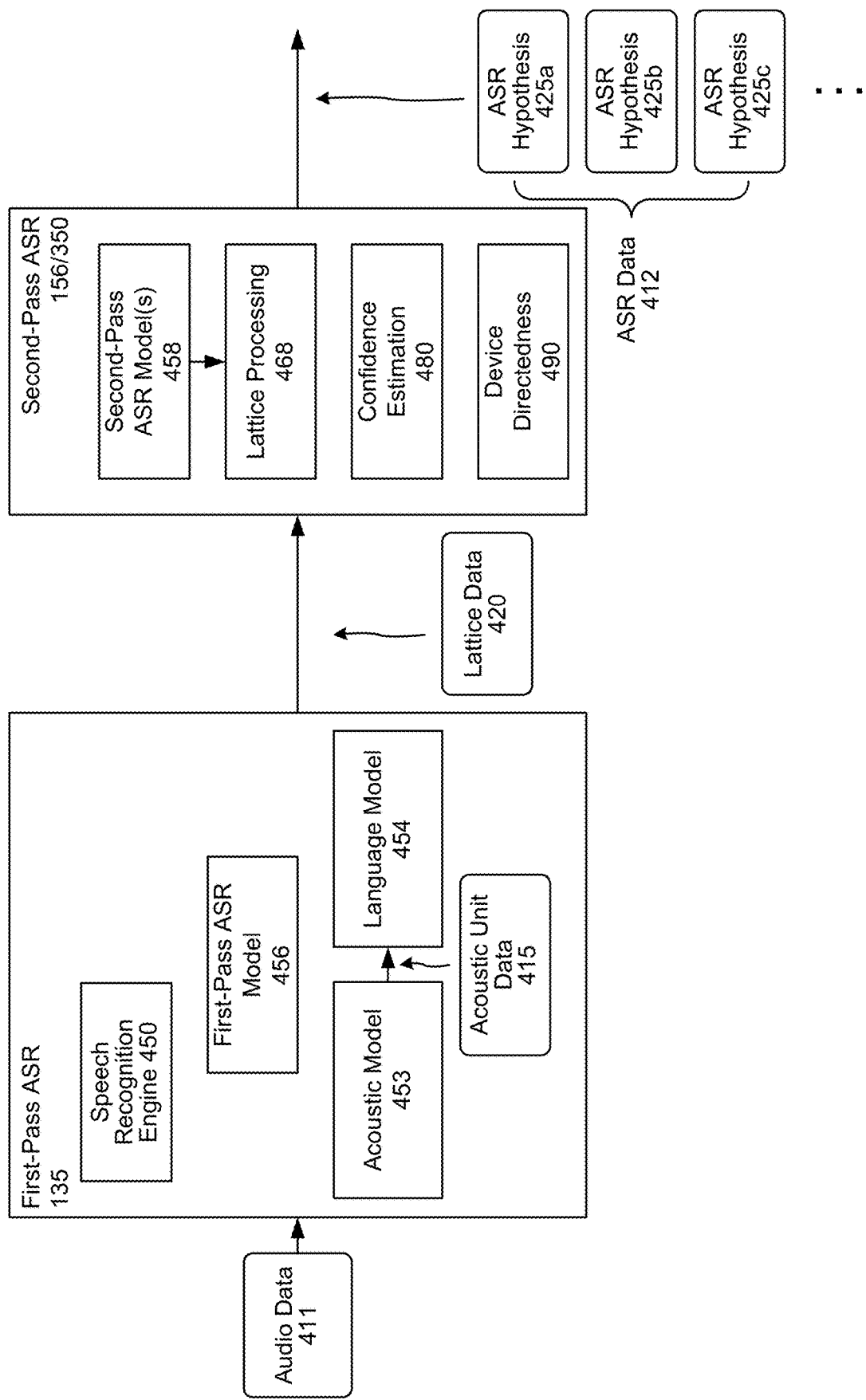
FIG. 4 is a conceptual diagram showing ASR processing in a first-pass ASR component and a second ASR component, according to embodiments of the present disclosure.

FIG. 4 is a conceptual diagram of an ASR component that may represent one or a combination of the first-pass ASR component 135, the second-pass ASR component 156 and/or the second-pass ASR component 350, according to embodiments of the present disclosure. The ASR components 135/156/350 may work in combination to interpret a spoken natural language input based on the similarity between the spoken natural language input and pre-established models such as one or more first-pass ASR model(s) 456 and/or second-pass ASR model(s) 458. For example, the ASR component 135/156/350 may compare the audio data with models for sounds (e.g., subword units or phonemes) and sequences of sounds to identify words that match the sequence of sounds spoken in the natural language input. The first-pass ASR component 135 may receive the audio data 411 and output lattice data 420 including one or more word lattices indicating possible sequences of words/subwords and associated probabilities. The second-pass ASR component 156/350 may receive the lattice data 420 and further process it to generate one or more ASR hypothes(is/es) that may be, for example, forwarded to the NLU component 360 for NLU processing to determine command data for execution by a skill component. The splitting of ASR processing into first-pass and second-pass operations may facilitate dividing speech processing operations between a first device or system 110 and a second device or system 120, as shown in FIG. 1.

The first-pass ASR component 135 may include a speech recognition engine 450. The first-pass ASR component 135 may receive the audio data 411 (for example, representing audio received at a microphone and an acoustic front end (AFE) or other component of the first device 110). The speech recognition engine 450 may compare the audio data 411 with the first-pass ASR model 456. The first-pass ASR model 456 may represent a neural network including, for example, and encoder and decoder networks trained using examples of human speech to infer words and/or subwords based on the received audio data 411. In some implementations, the speech recognition engine 450 may alternatively or additionally compare the audio data 411 with the acoustic models 453, language models 454, FST(s), and/or other data models and information for recognizing the speech conveyed in the audio data. The audio data 411 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

Figure 8:
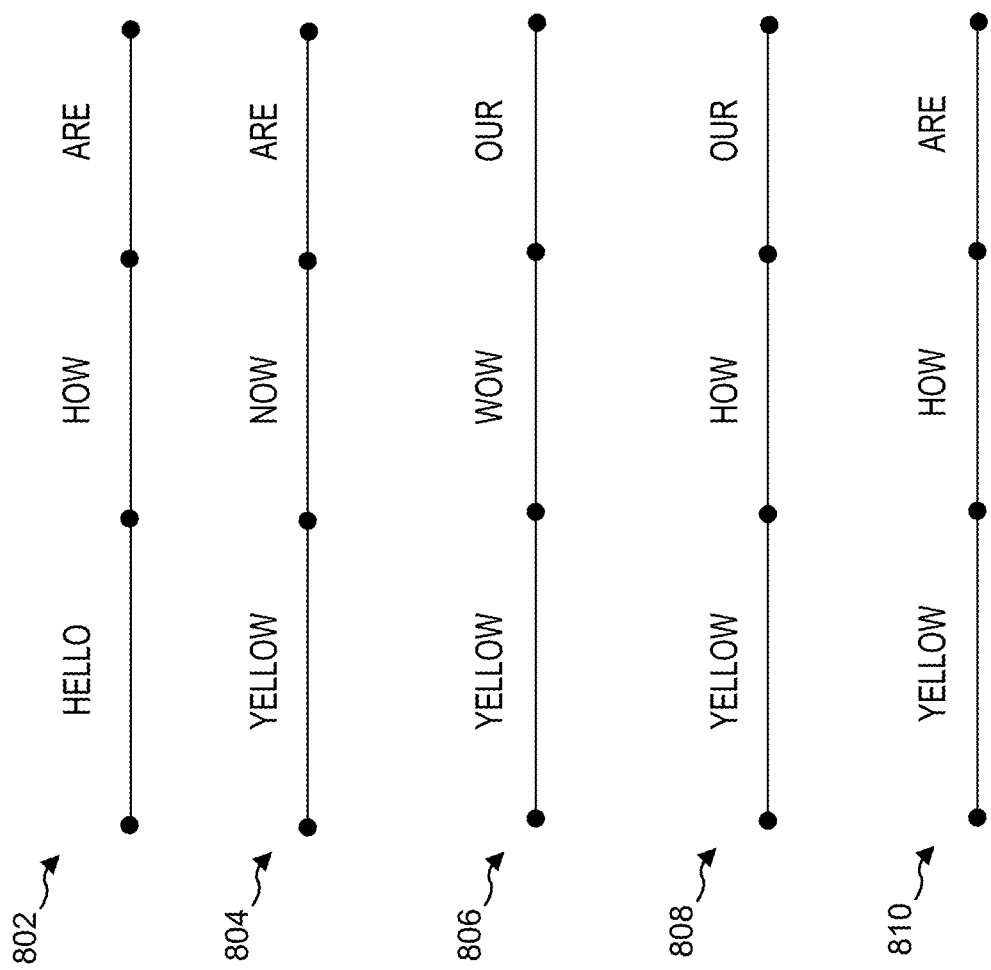
FIG. 8 illustrates a number of hypotheses associated with the lattice of FIG. 6.

The speech recognition engine 450 may process the audio data 411 to generate the lattice data 420 representing one or more word lattices such as those illustrated in FIGS. 6 and 8 below. The lattice data 420 may represent a graph of words or subwords with probabilities associated with various combinations or sequences of the words or subwords. The lattice data 420 may include multiple and/or versions of word lattices and/or subword lattices including (e.g., speculative, preview, and/or final lattices) that may be updated as the first-pass ASR components 135 continue to receive audio data 411. For example, the first-pass ASR component 135 may receive successive portions of audio data corresponding to an utterance. The first-pass ASR component 135 may process first audio data representing a first portion of an utterance to generate first lattice data representing a first possible transcription of the first portion of the utterance. The first-pass ASR component 135 may subsequently process second audio data representing a second portion of the utterance to generate second lattice data representing a second possible transcription of both the first portion of the utterance and the second portion of the utterance. That is, based on the subsequently received audio data, first-pass ASR component 135 may refine its previous transcription by, for example, adding and/or removing words/subwords, adjusting confidence scores, etc., such that a portion of the second lattice data may represent a revision of the first lattice data. The lattice data 420 may be included in the intermediate data 310 along with, for example, output data from one or more of the audio data processing components 140.

In some implementations, the speech recognition engine 450 may attempt to match received feature vectors to language acoustic units (e.g., phonemes) and words as known in the stored acoustic models 453, language models 454, and FST(s). For example, audio data 411 may be processed by one or more acoustic model(s) 453 to determine acoustic unit data 415. The acoustic unit data 415 may include indicators of acoustic units detected in the audio data 411 by the first-pass ASR component 135. For example, acoustic units can consist of one or more of phonemes, diaphonemes, tonemes, phones, diphones, triphones, or the like. The acoustic unit data 415 can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data 415 may be processed using the language model 454 (and/or using FST) to determine lattice data, which may then be sent to further components (such as the second-pass ASR component 156/350) for further processing as discussed herein. The speech recognition engine 450 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the first-pass ASR component 135 will output lattice data including sequences that make sense grammatically. The specific models used may be general models or may be models corresponding to a particular domain, such as music, banking, etc.

The speech recognition engine 450 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 450 may use the acoustic model(s) 453 to attempt to match received audio feature vectors to words or subword acoustic units. An acoustic unit may be a senon, phoneme, phoneme in context, syllable, part of a syllable, syllable in context, or any other such portion of a word. The speech recognition engine 450 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 135/156/350 outputs ASR hypotheses that make sense grammatically.

The speech recognition engine 450 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 450, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 450 may also compute scores of branches of the paths based on language models or grammars. Language modeling involves determining scores for what words are likely to be used together to form coherent words and sentences. Application of a language model may improve the likelihood that the first-pass ASR component 135 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

A second-pass ASR component 156 of the first device 110 and/or a second-pass ASR component 350 of the second device or system 120 may receive the lattice data 420 and perform further processing using, for example, one or more second-pass ASR models 458. The second-pass ASR component 156/350 may include a lattice processing component 468 that may leverage one or more second-pass ASR models 458 to generate the ASR hypotheses 425. The lattice processing component 468 may refine or otherwise process the lattice data 420 to generate one or more ASR hypotheses 425a, 425b, 425c, etc. (collectively "ASR hypotheses 425").

The second-pass ASR component 156 (e.g., of the first device 110) and the second ASR component 350 (e.g., of the second device or system 120) may not use the same second-pass ASR models 458. For example, the second ASR component 350 may have access to more and/or more extensive second-pass ASR models 458 than, for example, the second-pass ASR component 156. The second-pass ASR component 156 may use a second-pass ASR model 458 that emphasizes or is limited to command executable on the first device 110 (e.g., using a first skill component 180 and/or a hardware capability of the first device 110 and/or another device linked to or otherwise under the control of the first device 110). In some implementations, the second-pass ASR model 458 may depend on a characteristic of the audio, for example, as determined by an audio data processing component 140 and/or 905, and included in the intermediate data 310. For example, the system 120 may receive the intermediate data along with an indication of a speaker identifier, and thus cause the second ASR component 350 to process the lattice data 420 using a second-pass ASR model 458 associated with the speaker identifier (e.g., a personalized ASR model and/or one reflecting a language and/or dialect associated with the speaker identifier). In another example, the system 120 may receive the intermediate data along with a whisper detection signal, and thus cause the second ASR component 350 to process the lattice data 420 using a second-pass ASR model 458 associated with a whisper mode (e.g., for recognizing whispered speech).

The second-pass ASR component 156/350 may include additional components including a confidence estimation component 480 and/or a device directedness component 490. The confidence estimation component 480 may determine a confidence score for an ASR hypothesis 425 and/or rank the ASR hypotheses 425 based on respective confidence scores. The device directedness component 490 may determine a device directedness score for an ASR hypothesis 425 representing an estimated probability that the speech represented in the ASR hypothesis was directed to the device 110 as opposed to, for example, another person near the user 5. In some implementations, the first-pass ASR component 135 may include a confidence estimation component 480 and/or device directedness component 490 in addition to or instead of the second-pass ASR component 156/350. When the ASR component 135/156/350 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage), and the likelihood that a particular word, which matches the sounds, would be included in the sentence at the specific location (e.g., using a language model 454). Based on the considered factors and the assigned confidence score, the ASR component 135/156/350 may output an ASR hypothesis that most likely matches the spoken natural language input, or may output multiple ASR hypotheses in the form of a lattice or an N-best list, with each ASR hypothesis corresponding to a respective score.

Figure 5:
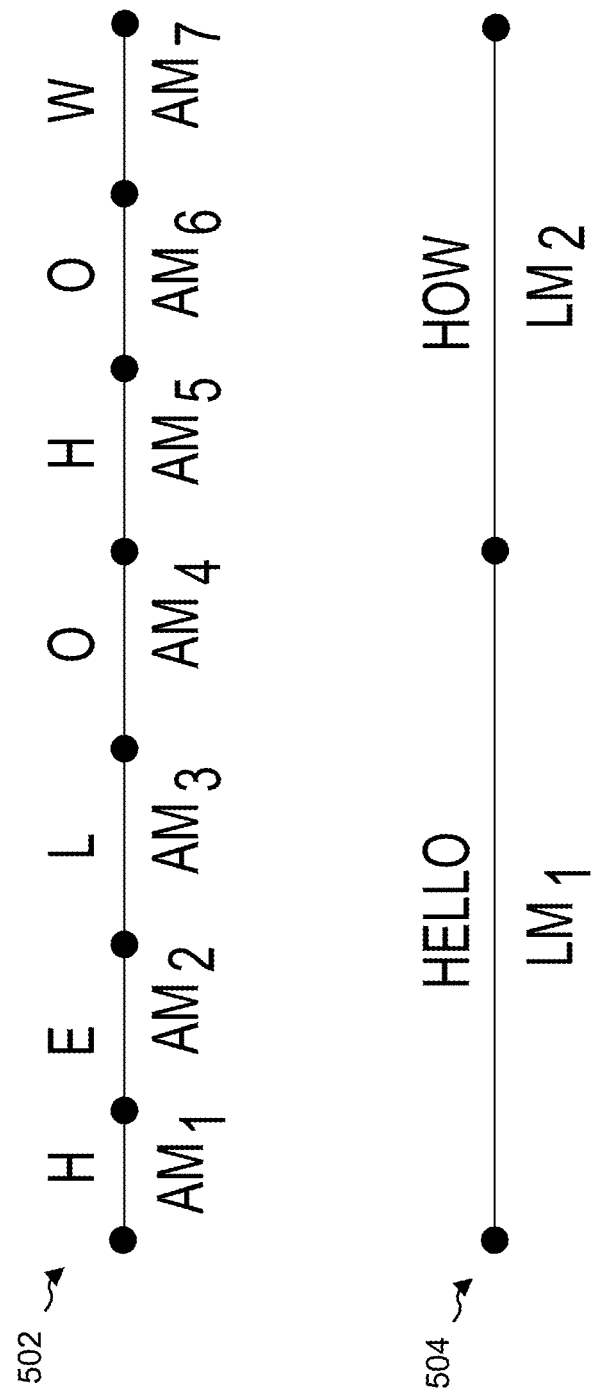
FIG. 5 illustrates phoneme processing and word processing according to one aspect of the present disclosure.

FIG. 5 illustrates the relationship between acoustic modeling and language modeling. As illustrated, each processed phoneme included in the path 502 is associated with a score; for example, an acoustic model score AM1 through AM7. The language model is then applied to associate each word in the path 504 with another score; for example, a language model score LM1 or LM2. Some ASR modeling—for example, end-to-end ASR modeling—may combine or otherwise perform the functions of separate acoustic and language models, and determine scores that reflect both an acoustic similarity between the word/subword and the audio data as well as a likelihood of the words/subwords appearing in the sequence.

As part of the language modeling (or in other phases of the ASR processing) the speech recognition engine 450 may, to save computational resources, prune and discard low recognition score states or paths that have little likelihood of corresponding to the spoken utterance, either due to low recognition score pursuant to the language model, or for other reasons. Such pruned paths/hypotheses are considered inactive. Active hypotheses are hypotheses that are still under consideration by the speech recognition engine 450. Thus, active hypotheses may have a confidence score that is above a certain threshold as they have thus far avoided pruning. As ASR processing continues, at different points in the ASR processing different hypotheses may be considered "active" as other hypotheses are added and/or removed from active consideration based on incoming audio data and acoustic model processing. Further, during the ASR processing the speech recognition engine 450 may iteratively perform additional processing passes on previously processed utterance portions. Later passes may incorporate results of earlier passes to refine and improve results. Paths which are being currently processed and considered as a potential output of the system are thus considered active hypotheses.

Figure 6:
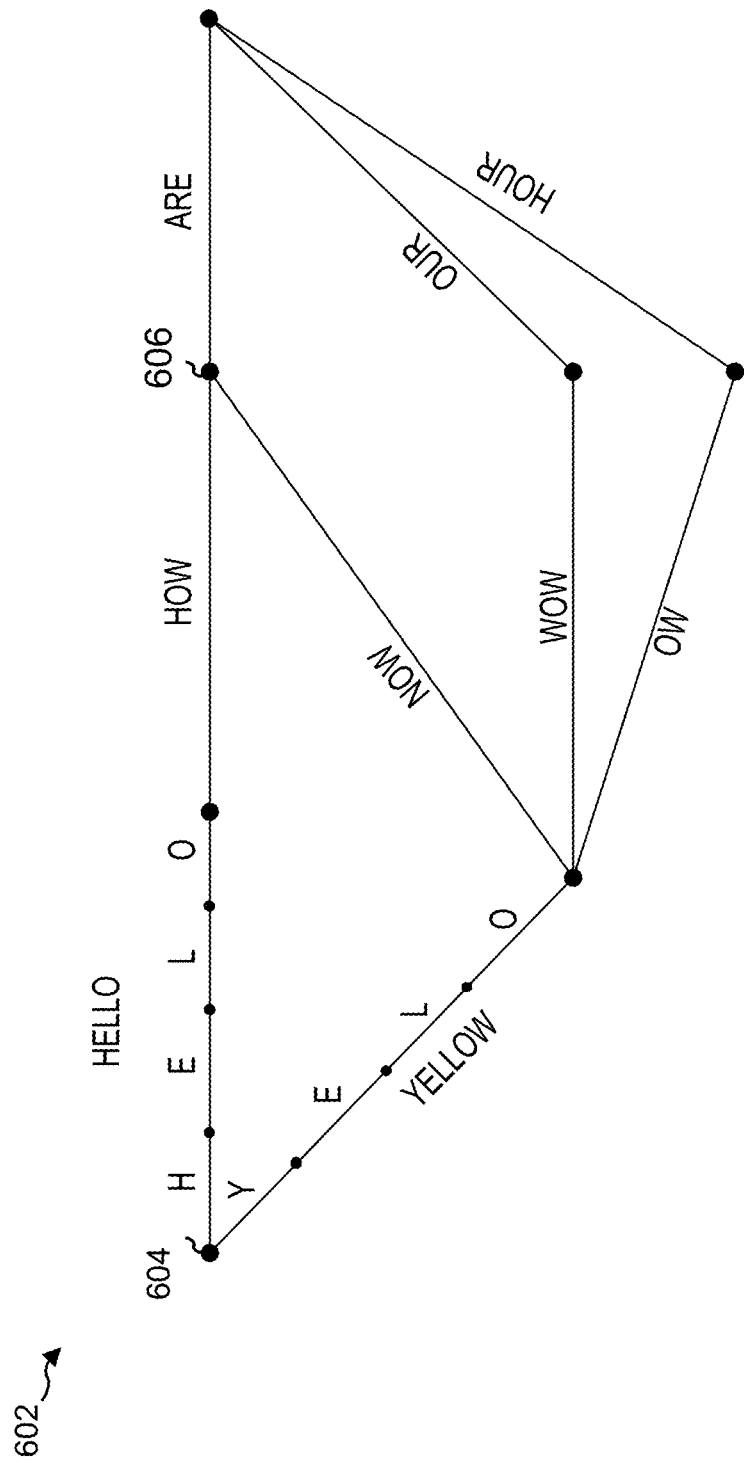
FIG. 6 illustrates a speech recognition lattice according to one aspect of the present disclosure.

FIG. 6 illustrates a speech recognition lattice 602 according to one aspect of the present disclosure. The speech recognition engine 450 may combine potential paths into a lattice representing speech recognition results. A sample lattice is shown in FIG. 6. The lattice 602 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 604 and node 606 represent two potential word choices, "hello how" or "yellow now". Each path point between nodes (such as a potential word) is associated with a recognition score. Each path across the lattice may also be assigned a recognition score. The highest recognition score path, where the recognition score is a result of an end-to-end ASR model score; a combination of the acoustic model score, the language model score; and/or other factors, may be included in the lattice data 420.

FIG. 7 illustrates speech recognition lattices according to one aspect of the present disclosure, and as may be represented in the lattice data 420. FIG. 8 illustrates a number of hypotheses associated with the lattice of FIG. 6. Illustrated in FIG. 7 are different potential paths 702, 704, and 706 along the lattice 602. As shown in FIG. 7, path 702 results in "hello how are," path 704 results in "yellow now are" and path 706 results in "yellow wow our." As can be seen, many such paths are possible even in the small example lattice 602. An example of such paths 802, 804, 806, 808, and 810 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

In another example, the speech recognition engine 450 may receive a series of feature vectors for sound corresponding to a user saying "There is a bat in my car." The speech recognition engine 450 may attempt to match each feature vector with an acoustic unit, such as a phoneme. As new feature vectors are processed, the speech recognition engine 450 may determine state transitions (for example, using HMMs) to determine whether a probability of whether a state should either remain the same, or change to a new state (i.e., whether an incoming feature vector results in a state transition from one phoneme to another). As the processing continues, the speech recognition engine 450 continues calculating such state transition probabilities. After processing one feature vector, the speech recognition engine 450 may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 450 may also calculate potential states for other phonemes. In this manner multiple states and state transition probabilities may be calculated.

The probable states and probable state transitions calculated by the speech recognition engine 450 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score, or probabilities may be converted to the log domain and added to assist processing.

The speech recognition engine 450 may also compute scores of branches of the paths based on language models or grammars. Language modeling involves determining scores for what words are likely to be used together to form coherent words and sentences. Application of a language model 454 may improve the likelihood that the ASR component 156/350 may correctly interpret the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken natural language input. The language modeling may be determined from a text corpus and may be customized for particular applications.

As the speech recognition engine 450 determines potential words from the input audio data, the lattice may become very large as many potential sounds and words are considered as potential matches for the input audio data. The potential matches may be illustrated as a word result network representing possible sequences of words that may be recognized and the likelihood of each sequence.

The lattice data 420 generated by the first-pass ASR component 135 may be sent to the second-pass ASR component 156 for further processing and/or included in the intermediate data 310 sent to the second-pass ASR components 350 on the system 120 for processing.

Figure 9:
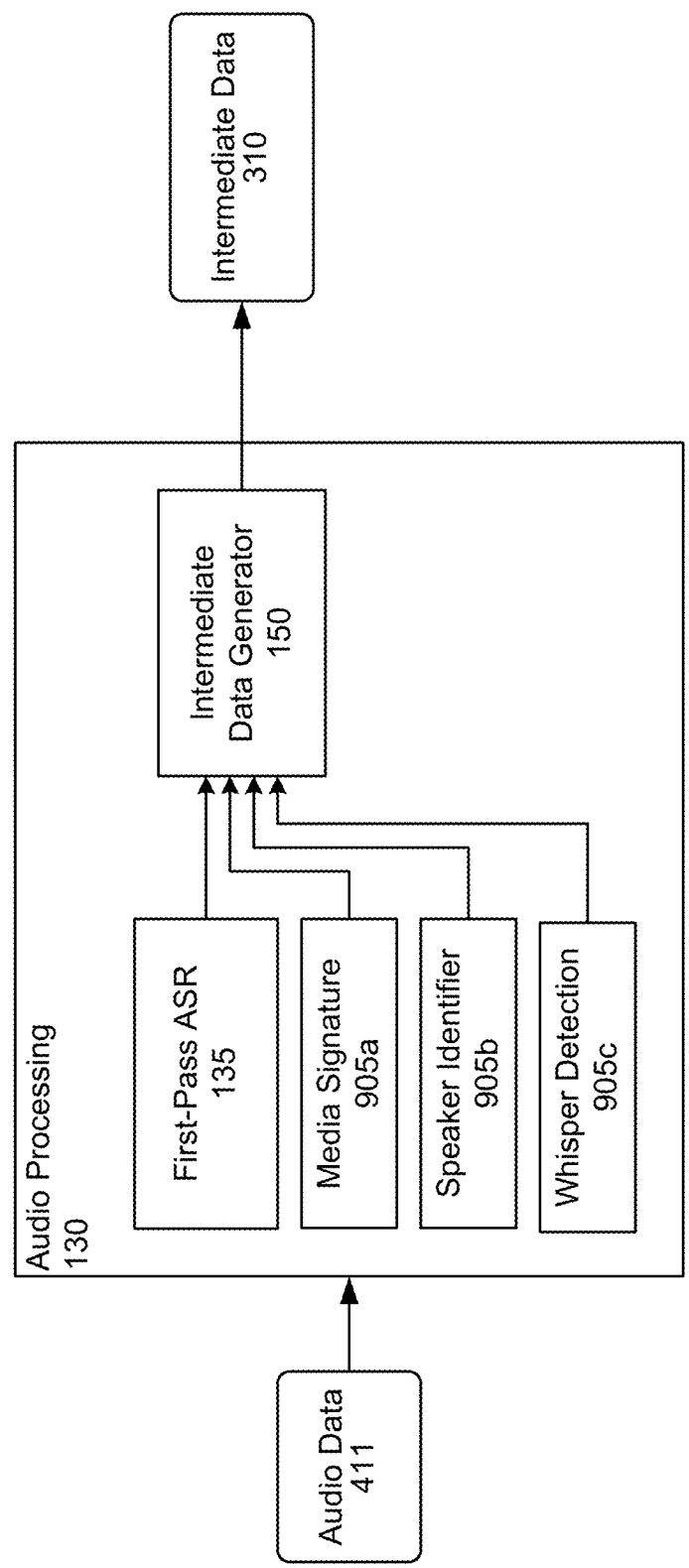
FIG. 9 is a conceptual diagram of an on-device audio processing component for generating intermediate data, according to embodiments of the present disclosure.

FIG. 9 is a conceptual diagram of an audio processing components 130 for generating intermediate data, according to embodiments of the present disclosure. The audio processing components 130 can include the first-pass ASR component 135 and one or more audio data processing components 905*a*, 905*b*, 905*c*, etc. (collectively "audio data processing components 905"), similar to the audio data processing components 140 previously described and having particular applications. For example, the audio data processing components 905 may include, without limitation, a media signature detection component 905*a*, a speaker identification component 905*b*, and/or a whisper detection component 905*c*, etc. The audio processing components 130 may include the intermediate data generator 150, which may combine the data produced by the first-pass ASR component 135 and audio data processing components 905 into an intermediate data stream 310. An example intermediate data stream 310 is described in additional detail below with reference to FIG. 10.

The first-pass ASR component 135 may generate a word lattice or subword lattice as previously described. Because the first-pass ASR component 135 may process audio data continuously during audio capture (e.g., until an end of utterance is detected), the first-pass ASR component 135 may generate various versions of the word lattice including, for example, a speculative lattice, a preview lattice, and a final lattice.

The media signature detection component 905a may receive the audio data and compare features of the audio data to one or more stored signatures (e.g., fingerprints) corresponding to representations of wakewords as they may appear in media; for example, a media event such as a television and/or radio broadcast. The media may include advertisements, songs, TV shows, movies, etc. currently being played back in the vicinity of the device 110 (and possibly by the device 110 itself). The system 100 may use false wakeword detection signal to, for example, suppress execution of a command that may have been mistakenly initiated based on detection of the wakeword. The output of the media signature detection component 905a may be, for example, a flag indicating detection of a false wakeword event and/or an identifier (e.g., a media signature) corresponding to the false wakeword detected.

The speaker identification component 905b may process the audio data to determine an identity of the speaker. The speaker identification component 905b may compare features of the audio data to stored features corresponding to various users to identify one or more possible speakers. In some implementations, an output of the speaker identification component 905b may include a 1-best or n-best list of possible speaker identifiers, and in some case may include one or more confidence scores associated with the one or more possible speaker identifiers. The output of the speaker identification component 905b may be used on the device 110 and/or included in the intermediate data stream 310 to aid in user recognition and/or to identify user-specific models and/or libraries for processing speech associated with that speaker identifier.

The whisper detection component 905c may process the audio data to determine whether a speaker is speaking in a whisper; e.g., rather than in a normal voice. If the whisper detection component 905c determines that the user is whispering, the device 110 and/or the system 120 may process the speech in a whisper mode and/or provide responses in a whisper mode. Whisper mode speech processing may include using different acoustic and/or language models suited to the different audio characteristics of whispered speech versus normal speech. Whisper mode speech generation may include generating synthetic speech having a lower overall volume and/or a different timbre quality that, for example, may be less likely to disturb other people in the vicinity of the device 110 such as a sleeping infant.

The device 110 may include other audio data processing components 905 including, for example and without limitation, an audio feature extractor, a wakeword verification component, an ESP component, an AED detection component, etc.

Figure 10:
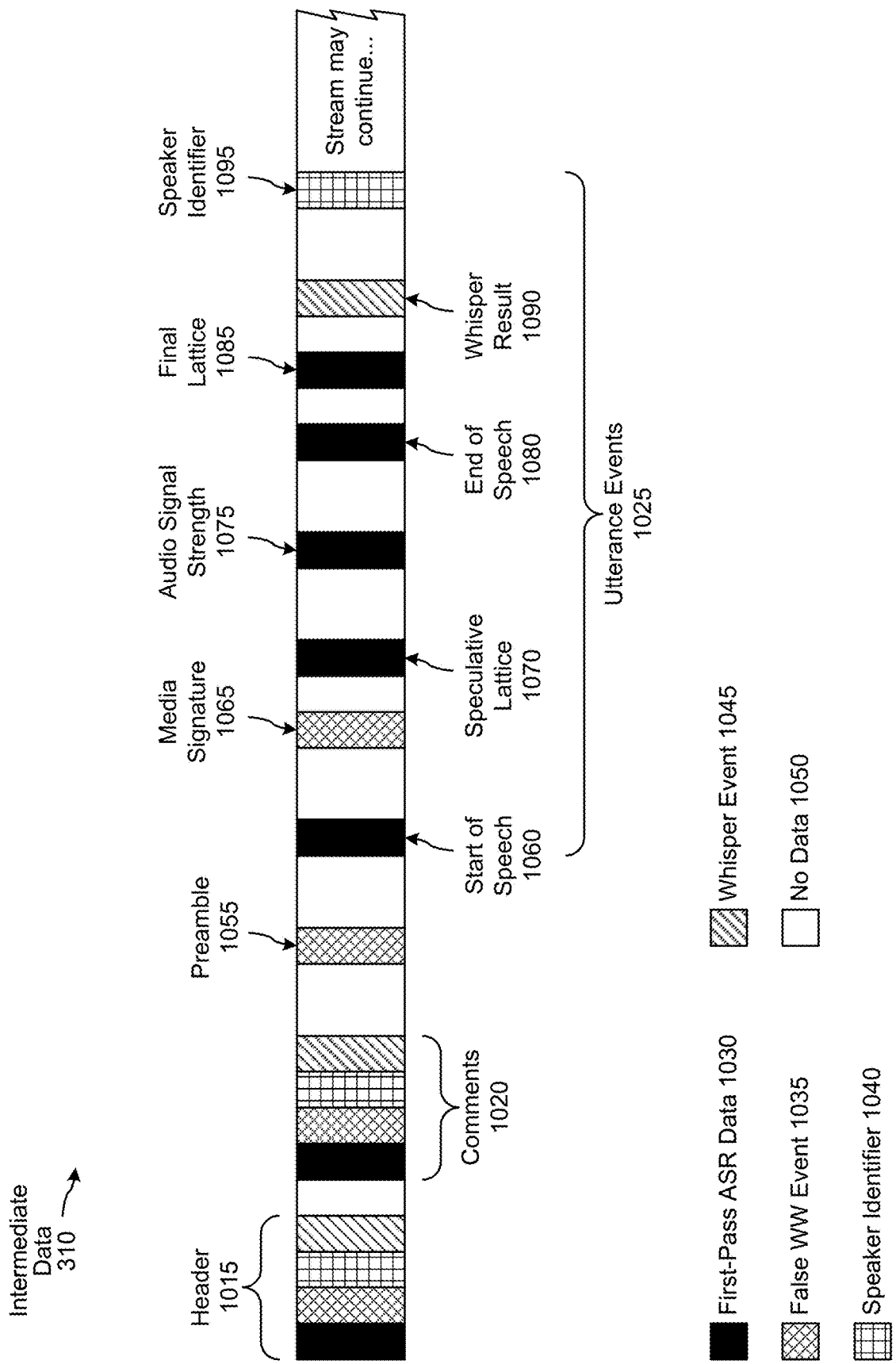
FIG. 10 is a conceptual diagram illustrating an example of an intermediate data stream, according to embodiments of the present disclosure.

FIG. 10 is a conceptual diagram illustrating an example of an intermediate data stream 310, according to embodiments of the present disclosure. The intermediate data stream 310 shown in FIG. 10 may include first-pass ASR data 1030, a false wakeword event signal 1035, a speaker identifier 1040, and/or a whisper event signal 1045. In various implementations, the intermediate data stream 310 may include more or fewer features/signals. The intermediate data stream 310 may include blank regions 1050 where there is no data. The intermediate data stream 310 may be a physical bitstream composed of interleaved pages, where each page may belong to a single logical bitstream sourced by one of the audio data processing components 905. For example, the first-pass ASR data 1030 may represent a first logical bit stream, the false wakeword event signal 1035 may represent a second logical bitstream, etc. A bitstream may be a discontinuous set of pages representing data from a single source (e.g., a microphone, the first-pass ASR data 1030, or one of the audio data processing components 905). A page may be a container for the data from a single logical bitstream. The page may start with an ID header and a commend header, followed by event data packets. A data packet may be a container for the actual data with the page. The pages and/or packets may have fixed and/or bounded sized. For example, a page may have a maximum size of 64 kilobytes and a data packet may be organized in to 255 byte segments. The intermediate data generator 150 may multiplex the disparate logical bitstreams into a single physical bitstream making up the intermediate data stream 310. The intermediate data stream 310 may include header and/or comment information for data from respective sources. The intermediate data may include and/or refer to various data corresponding to a single utterance; for example, a plurality of first-pass ASR hypotheses and one or more characteristics of the audio data. Thus, one or more receiving components, devices, and/or systems may process the data with reference to, for example, a particular user ID, speaker ID, utterance ID, and/or dialog session.

Thus, the example intermediate data stream 310 may include a header 1015 that may include an identifier corresponding to each logical bitstream in the intermediate data stream 310. The intermediate data stream 310 may further include a comment 1020 for each logical bitstream. In the case of a false wakeword detection event, the intermediate data stream 310 may include preamble data 1055 corresponding to a detected event. The intermediate data stream 310 may include utterance events 1025 including, for example and without limitation, a start of speech signal 1060, a media identifier 1065 corresponding to the detected wakeword, a speculative lattice 1070 from the first-pass ASR component 135, audio signal information 1075, an end of speech indicator 1080, a final lattice 1085, a whisper detection result 1090, and a speaker identifier 1095. The intermediate data generator 150 may continue to stream additional utterance events 1025 until the first-pass ASR component 135 or other component indicates that streaming should cease; for example, because a speech endpoint was detected, wakeword verification failed, or some other error manifested. However, the intermediate data generator 150 may continue generating and transmitting the intermediate data stream 310 in the event of certain isolated failures of, for example, one or more audio data processing components 905.

Figure 11:
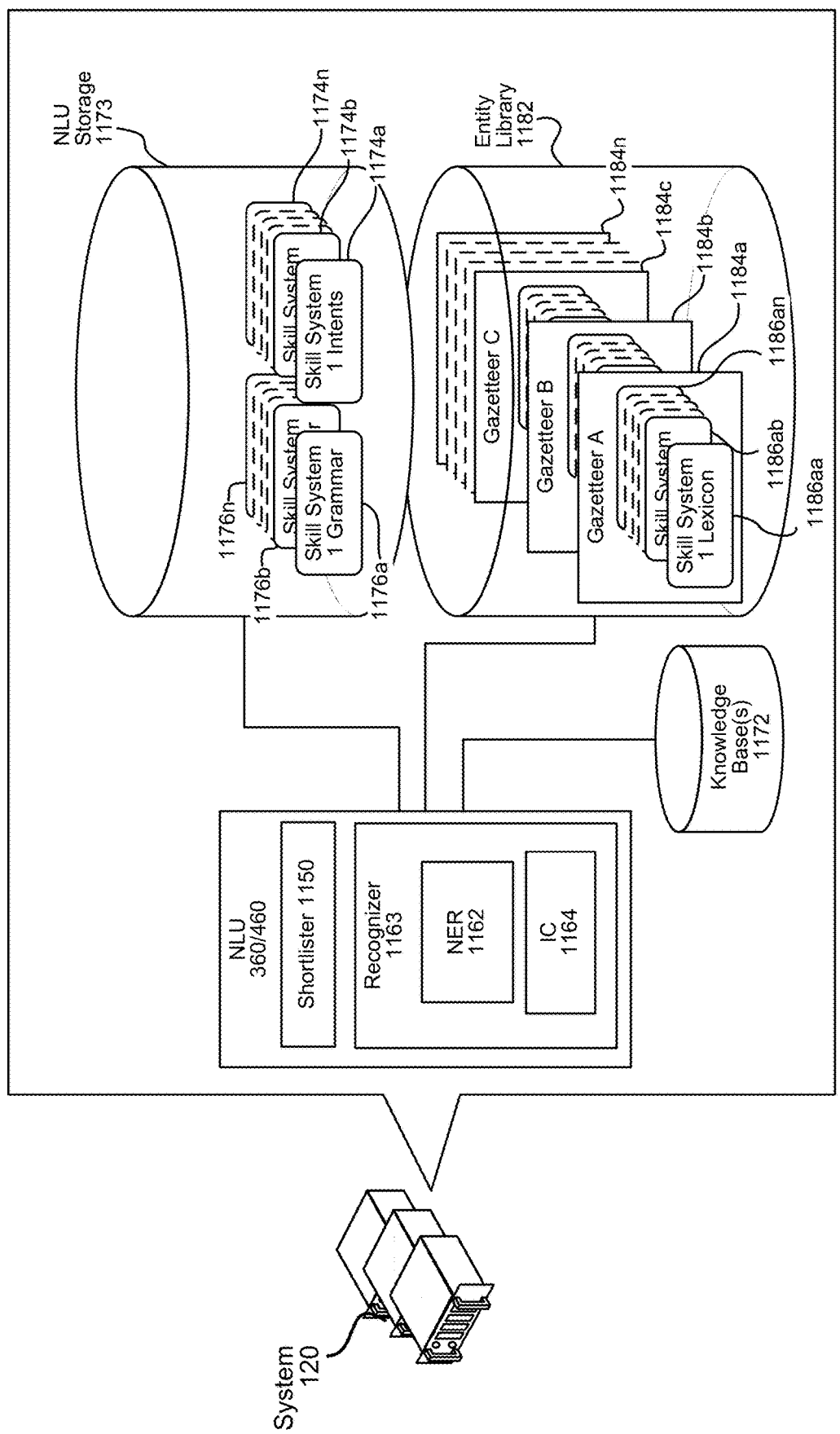
FIG. 11 is a conceptual diagram of how natural language processing is performed, according to embodiments of the present disclosure.
Figure 12:
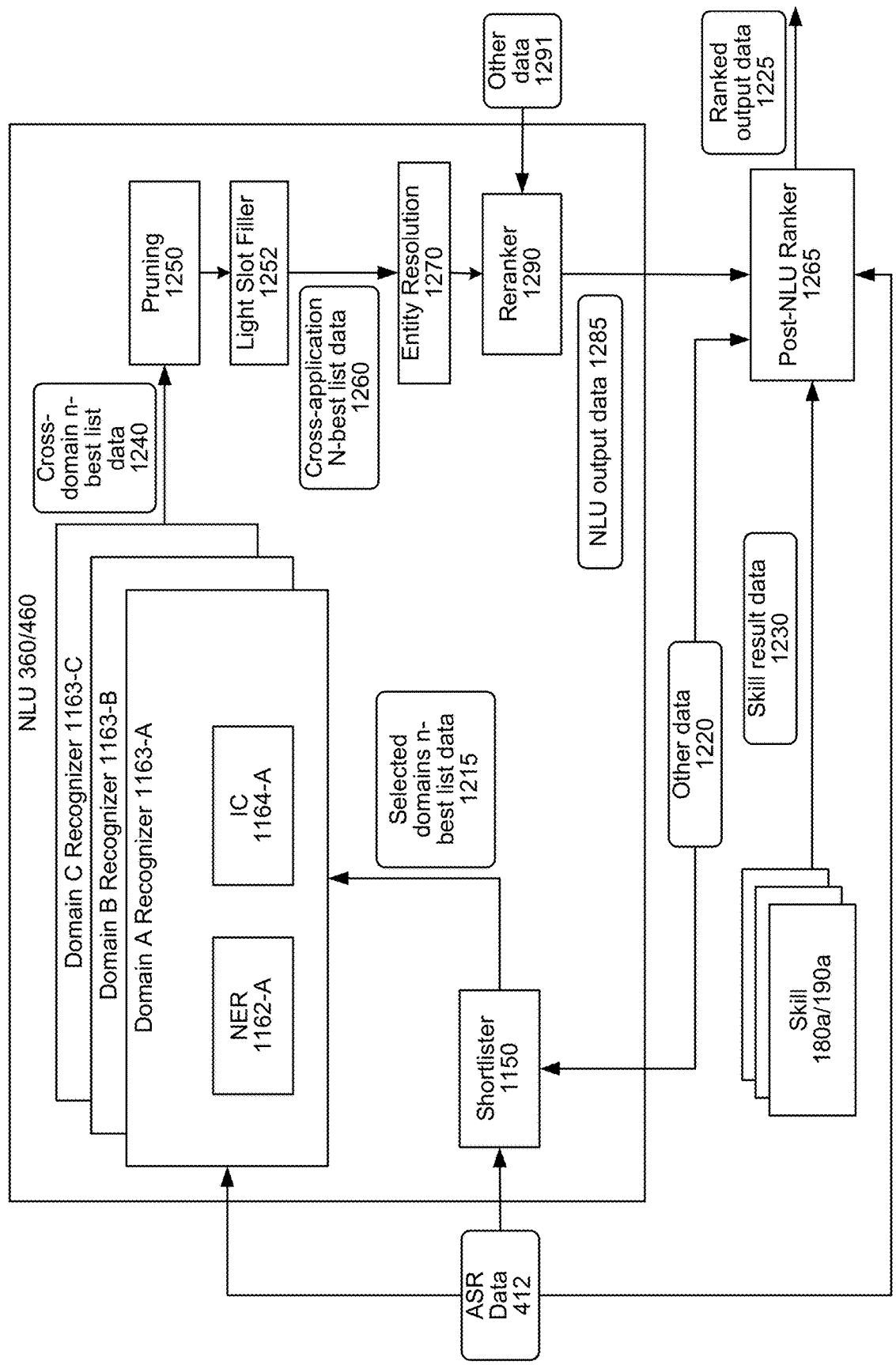
FIG. 12 is a conceptual diagram of how natural language processing is performed, according to embodiments of the present disclosure.

FIGS. 11 and 12 illustrates how the NLU component 360/460 may perform NLU processing. FIG. 11 is a conceptual diagram of how natural language processing is performed, according to embodiments of the present disclosure. And FIG. 12 is a conceptual diagram of how natural language processing is performed, according to embodiments of the present disclosure.

FIG. 11 illustrates how NLU processing is performed on text data. The NLU component 360/460 may process text data including several ASR hypotheses of a single user input. For example, if the ASR component 135/156/350 outputs text data including an n-best list of ASR hypotheses, the NLU component 360/460 may process the text data with respect to all (or a portion of) the ASR hypotheses represented therein.

The NLU component 360/460 may annotate text data by parsing and/or tagging the text data. For example, for the text data "tell me the weather for Seattle," the NLU component 360/460 may tag "tell me the weather for Seattle" as an <OutputWeather> intent as well as separately tag "Seattle" as a location for the weather information.

The NLU component 360/460 may include a shortlister component 1150. The shortlister component 1150 selects skills that may execute with respect to ASR output data 412 input to the NLU component 360/460 (e.g., applications that may execute with respect to the user input). The ASR output data 412 may include representations of text of an utterance, such as words, subword units, or the like. The shortlister component 1150 thus limits downstream, more resource intensive NLU processes to being performed with respect to skills that may execute with respect to the user input.

Without a shortlister component 1150, the NLU component 360/460 may process ASR output data 412 input thereto with respect to every skill of the system, either in parallel, in series, or using some combination thereof. By implementing a shortlister component 1150, the NLU component 360/460 may process ASR output data 412 with respect to only the skills that may execute with respect to the user input. This reduces total compute power and latency attributed to NLU processing.

The shortlister component 1150 may include one or more trained models. The model(s) may be trained to recognize various forms of user inputs that may be received by the system(s) 120. For example, during a training period skill support system(s) 325 associated with a skill may provide the system(s) 120 with training text data representing sample user inputs that may be provided by a user to invoke the skill. For example, for a ride sharing skill, a skill support system(s) 325 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1150 may be trained, using the training text data representing sample user inputs, to determine other potentially related user input structures that users may try to use to invoke the particular skill. During training, the system(s) 120 may solicit the skill support system(s) 325 associated with the skill regarding whether the determined other user input structures are permissible, from the perspective of the skill support system(s) 325, to be used to invoke the skill. The alternate user input structures may be derived by one or more trained models during model training and/or may be based on user input structures provided by different skills. The skill support system(s) 325 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1150 may be trained with respect to a different skill. Alternatively, the shortlister component 1150 may use one trained model per domain, such as one trained model for skills associated with a weather domain, one trained model for skills associated with a ride sharing domain, etc.

The system(s) 120 may use the sample user inputs provided by a skill support system(s) 325, and related sample user inputs potentially determined during training, as binary examples to train a model associated with a skill associated with the skill support system(s) 325. The model associated with the particular skill may then be operated at runtime by the shortlister component 1150. For example, some sample user inputs may be positive examples (e.g., user inputs that may be used to invoke the skill). Other sample user inputs may be negative examples (e.g., user inputs that may not be used to invoke the skill).

As described above, the shortlister component 1150 may include a different trained model for each skill of the system, a different trained model for each domain, or some other combination of trained model(s). For example, the shortlister component 1150 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1150 to output indications of only a portion of the skills that the ASR output data 412 may relate to. For example, a user input may correspond to "tell me about Tom Collins." If the model is clustered based on domain, the shortlister component 1150 may determine the user input corresponds to a recipe skill (e.g., a drink recipe) even though the user input may also correspond to an information skill (e.g., including information about a person named Tom Collins).

The NLU component 360/460 may include one or more recognizers 1163. In at least some embodiments, a recognizer 1163 may be associated with a skill support system 325 (e.g., the recognizer may be configured to interpret text data to correspond to the skill support system 325). In at least some other examples, a recognizer 1163 may be associated with a domain such as smart home, video, music, weather, custom, etc. (e.g., the recognizer may be configured to interpret text data to correspond to the domain).

If the shortlister component 1150 determines ASR output data 412 is potentially associated with multiple domains, the recognizers 1163 associated with the domains may process the ASR output data 412, while recognizers 1163 not indicated in the shortlister component 1150's output may not process the ASR output data 412. The "shortlisted" recognizers 1163 may process the ASR output data 412 in parallel, in series, partially in parallel, etc. For example, if ASR output data 412 potentially relates to both a communications domain and a music domain, a recognizer associated with the communications domain may process the ASR output data 412 in parallel, or partially in parallel, with a recognizer associated with the music domain processing the ASR output data 412.

Each recognizer 1163 may include a named entity recognition (NER) component 1162. The NER component 1162 attempts to identify grammars and lexical information that may be used to construe meaning with respect to text data input therein. The NER component 1162 identifies portions of text data that correspond to a named entity associated with a domain, associated with the recognizer 1163 implementing the NER component 1162. The NER component 1162 (or other component of the NLU component 360/460) may also determine whether a word refers to an entity whose identity is not explicitly mentioned in the text data, for example "him," "her," "it" or other anaphora, exophoraa, or the like.

Each recognizer 1163, and more specifically each NER component 1162, may be associated with a particular grammar database 1176, a particular set of intents/actions 1174, and a particular personalized lexicon 1186. The grammar databases 1176, and intents/actions 1174 may be stored in an NLU storage 1173. Each gazetteer 1184 may include domain/skill-indexed lexical information associated with a particular user and/or device 110. For example, a Gazetteer A (1184a) includes skill-indexed lexical information 1186aa to 1186an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1162 applies grammar information 1176 and lexical information 1186 associated with a domain (associated with the recognizer 1163 implementing the NER component 1162) to determine a mention of one or more entities in text data. In this manner, the NER component 1162 identifies "slots" (each corresponding to one or more particular words in text data) that may be useful for later processing. The NER component 1162 may also label each slot with a type (e.g., noun, place, city, artist name, song name, etc.).

Each grammar database 1176 includes the names of entities (i.e., nouns) commonly found in speech about the particular domain to which the grammar database 1176 relates, whereas the lexical information 1186 is personalized to the user and/or the device 110 from which the user input originated. For example, a grammar database 1176 associated with a shopping domain may include a database of words commonly used when people discuss shopping.

A downstream process called entity resolution (discussed in detail elsewhere herein) links a slot of text data to a specific entity known to the system. To perform entity resolution, the NLU component 360/460 may utilize gazetteer information (1184a-1184n) stored in an entity library storage 1182. The gazetteer information 1184 may be used to match text data (representing a portion of the user input) with text data representing known entities, such as song titles, contact names, etc. Gazetteers 1184 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1163 may also include an intent classification (IC) component 1164. An IC component 1164 parses text data to determine an intent(s) (associated with the domain associated with the recognizer 1163 implementing the IC component 1164) that potentially represents the user input. An intent represents to an action a user desires be performed. An IC component 1164 may communicate with a database 1174 of words linked to intents. For example, a music intent database may link words and phrases such as "quiet," "volume off," and "mute" to a <Mute> intent. An IC component 1164 identifies potential intents by comparing words and phrases in text data (representing at least a portion of the user input) to the words and phrases in an intents database 1174 (associated with the domain that is associated with the recognizer 1163 implementing the IC component 1164).

The intents identifiable by a specific IC component 1164 are linked to domain-specific (i.e., the domain associated with the recognizer 1163 implementing the IC component 1164) grammar frameworks 1176 with "slots" to be filled. Each slot of a grammar framework 1176 corresponds to a portion of text data that the system believes corresponds to an entity. For example, a grammar framework 1176 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1176 may not be structured as sentences, but rather based on associating slots with grammatical tags.

For example, an NER component 1162 may parse text data to identify words as subject, object, verb, preposition, etc. based on grammar rules and/or models prior to recognizing named entities in the text data. An IC component 1164 (implemented by the same recognizer 1163 as the NER component 1162) may use the identified verb to identify an intent. The NER component 1162 may then determine a grammar model 1176 associated with the identified intent. For example, a grammar model 1176 for an intent corresponding to <PlayMusic> may specify a list of slots applicable to play the identified "object" and any object modifier (e.g., a prepositional phrase), such as {Artist Name}, {Album Name}, {Song name}, etc. The NER component 1162 may then search corresponding fields in a lexicon 1186 (associated with the domain associated with the recognizer 1163 implementing the NER component 1162), attempting to match words and phrases in text data the NER component 1162 previously tagged as a grammatical object or object modifier with those identified in the lexicon 1186.

An NER component 1162 may perform semantic tagging, which is the labeling of a word or combination of words according to their type/semantic meaning. An NER component 1162 may parse text data using heuristic grammar rules, or a model may be constructed using techniques such as Hidden Markov Models, maximum entropy models, log linear models, conditional random fields (CRF), and the like. For example, an NER component 1162 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1162 identifies "Play" as a verb based on a word database associated with the music domain, which an IC component 1164 (also implemented by the music domain recognizer) may determine corresponds to a <PlayMusic> intent. At this stage, no determination has been made as to the meaning of "mother's little helper" or "the rolling stones," but based on grammar rules and models, the NER component 1162 has determined the text of these phrases relates to the grammatical object (i.e., entity) of the user input represented in the text data.

An NER component 1162 may tag text data to attribute meaning thereto. For example, an NER component 1162 may tag "play mother's little helper by the rolling stones" as: {domain} Music, {intent}<PlayMusic>, {artist name} rolling stones, {media type} SONG, and {song title} mother's little helper. For further example, the NER component 1162 may tag "play songs by the rolling stones" as: {domain} Music, {intent}<PlayMusic>, {artist name} rolling stones, and {media type} SONG.

The shortlister component 1150 may receive ASR output data 412 output from the ASR component 135/156/350 or output from the device 110*b* (as illustrated in FIG. 12). The ASR component 135/156/350 may embed the ASR output data 412 into a form processable by a trained model(s) using sentence embedding techniques as known in the art. Sentence embedding results in the ASR output data 412 including text in a structure that enables the trained models of the shortlister component 1150 to operate on the ASR output data 412. For example, an embedding of the ASR output data 412 may be a vector representation of the ASR output data 412.

The shortlister component 1150 may make binary determinations (e.g., yes or no) regarding which domains relate to the ASR output data 412. The shortlister component 1150 may make such determinations using the one or more trained models described herein above. If the shortlister component 1150 implements a single trained model for each domain, the shortlister component 1150 may simply run the models that are associated with enabled domains as indicated in a user profile associated with the device 110 and/or user that originated the user input.

The shortlister component 1150 may generate n-best list data 1215 representing domains that may execute with respect to the user input represented in the ASR output data 412. The size of the n-best list represented in the n-best list data 1215 is configurable. In an example, the n-best list data 1215 may indicate every domain of the system as well as contain an indication, for each domain, regarding whether the domain is likely capable to execute the user input represented in the ASR output data 412. In another example, instead of indicating every domain of the system, the n-best list data 1215 may only indicate the domains that are likely to be able to execute the user input represented in the ASR output data 412. In yet another example, the shortlister component 1150 may implement thresholding such that the n-best list data 1215 may indicate no more than a maximum number of domains that may execute the user input represented in the ASR output data 412. In an example, the threshold number of domains that may be represented in the n-best list data 1215 is ten. In another example, the domains included in the n-best list data 1215 may be limited by a threshold a score, where only domains indicating a likelihood to handle the user input is above a certain score (as determined by processing the ASR output data 412 by the shortlister component 1150 relative to such domains) are included in the n-best list data 1215.

The ASR output data 412 may correspond to more than one ASR hypothesis. When this occurs, the shortlister component 1150 may output a different n-best list (represented in the n-best list data 1215) for each ASR hypothesis. Alternatively, the shortlister component 1150 may output a single n-best list representing the domains that are related to the multiple ASR hypotheses represented in the ASR output data 412.

As indicated above, the shortlister component 1150 may implement thresholding such that an n-best list output therefrom may include no more than a threshold number of entries. If the ASR output data 412 includes more than one ASR hypothesis, the n-best list output by the shortlister component 1150 may include no more than a threshold number of entries irrespective of the number of ASR hypotheses output by the ASR component 135/156/350. Alternatively or in addition, the n-best list output by the shortlister component 1150 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 412, the shortlister component 1150 may generate confidence scores representing likelihoods that domains relate to the ASR output data 412. If the shortlister component 1150 implements a different trained model for each domain, the shortlister component 1150 may generate a different confidence score for each individual domain trained model that is run. If the shortlister component 1150 runs the models of every domain when ASR output data 412 is received, the shortlister component 1150 may generate a different confidence score for each domain of the system. If the shortlister component 1150 runs the models of only the domains that are associated with skills indicated as enabled in a user profile associated with the device 110 and/or user that originated the user input, the shortlister component 1150 may only generate a different confidence score for each domain associated with at least one enabled skill. If the shortlister component 1150 implements a single trained model with domain specifically trained portions, the shortlister component 1150 may generate a different confidence score for each domain who's specifically trained portion is run. The shortlister component 1150 may perform matrix vector modification to obtain confidence scores for all domains of the system in a single instance of processing of the ASR output data 412.

N-best list data 1215 including confidence scores that may be output by the shortlister component 1150 may be represented as, for example:

Search domain, 0.67
Recipe domain, 0.62
Information domain, 0.57
Shopping domain, 0.42

As indicated, the confidence scores output by the shortlister component 1150 may be numeric values. The confidence scores output by the shortlister component 1150 may alternatively be binned values (e.g., high, medium, low).

The n-best list may only include entries for domains having a confidence score satisfying (e.g., equaling or exceeding) a minimum threshold confidence score. Alternatively, the shortlister component 1150 may include entries for all domains associated with user enabled skills, even if one or more of the domains are associated with confidence scores that do not satisfy the minimum threshold confidence score.

The shortlister component 1150 may consider other data 1220 when determining which domains may relate to the user input represented in the ASR output data 412 as well as respective confidence scores. The other data 1220 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1220 may include an indicator of the user associated with the ASR output data 412, for example as determined by the user-recognition component 149.

The other data 1220 may be character embedded prior to being input to the shortlister component 1150. The other data 1220 may alternatively be embedded using other techniques known in the art prior to being input to the shortlister component 1150.

The other data 1220 may also include data indicating the domains associated with skills that are enabled with respect to the device 110 and/or user that originated the user input. The shortlister component 1150 may use such data to determine which domain-specific trained models to run. That is, the shortlister component 1150 may determine to only run the trained models associated with domains that are associated with user-enabled skills. The shortlister component 1150 may alternatively use such data to alter confidence scores of domains.

As an example, considering two domains, a first domain associated with at least one enabled skill and a second domain not associated with any user-enabled skills of the user that originated the user input, the shortlister component 1150 may run a first model specific to the first domain as well as a second model specific to the second domain. Alternatively, the shortlister component 1150 may run a model configured to determine a score for each of the first and second domains. The shortlister component 1150 may determine a same confidence score for each of the first and second domains in the first instance. The shortlister component 1150 may then alter those confidence scores based on which domains is associated with at least one skill enabled by the present user. For example, the shortlister component 1150 may increase the confidence score associated with the domain associated with at least one enabled skill while leaving the confidence score associated with the other domain the same. Alternatively, the shortlister component 1150 may leave the confidence score associated with the domain associated with at least one enabled skill the same while decreasing the confidence score associated with the other domain. Moreover, the shortlister component 1150 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 147/370. When the shortlister component 1150 receives the ASR output data 412, the shortlister component 1150 may determine whether profile data associated with the user and/or device 110 that originated the command includes an indication of enabled skills.

The other data 1220 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1150 may use such data to determine which domain-specific trained models to run. For example, if the device 110 corresponds to a displayless type device, the shortlister component 1150 may determine not to run trained models specific to domains that output video data. The shortlister component 1150 may alternatively use such data to alter confidence scores of domains.

As an example, considering two domains, one that outputs audio data and another that outputs video data, the shortlister component 1150 may run a first model specific to the domain that generates audio data as well as a second model specific to the domain that generates video data. Alternatively the shortlister component 1150 may run a model configured to determine a score for each domain. The shortlister component 1150 may determine a same confidence score for each of the domains in the first instance. The shortlister component 1150 may then alter the original confidence scores based on the type of the device 110 that originated the user input corresponding to the ASR output data 412. For example, if the device 110 is a displayless device, the shortlister component 1150 may increase the confidence score associated with the domain that generates audio data while leaving the confidence score associated with the domain that generates video data the same. Alternatively, if the device 110 is a displayless device, the shortlister component 1150 may leave the confidence score associated with the domain that generates audio data the same while decreasing the confidence score associated with the domain that generates video data. Moreover, if the device 110 is a displayless device, the shortlister component 1150 may increase the confidence score associated with the domain that generates audio data as well as decrease the confidence score associated with the domain that generates video data.

The type of device information represented in the other data 1220 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1220 may represent the smart TV of other display device, and not the displayless device that captured the spoken user input.

The other data 1220 may also include data indicating the user input originating device's speed, location, or other mobility information. For example, the device may correspond to a vehicle including a display. If the vehicle is moving, the shortlister component 1150 may decrease the confidence score associated with a domain that generates video data as it may be undesirable to output video content to a user while the user is driving. The device may output data to the system(s) 120 indicating when the device is moving.

The other data 1220 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1150 may use such data to alter confidence scores of domains. For example, the shortlister component 1150 may run a first model specific to a first domain as well as a second model specific to a second domain. Alternatively, the shortlister component 1150 may run a model configured to determine a score for each domain. The shortlister component 1150 may also determine a same confidence score for each of the domains in the first instance. The shortlister component 1150 may then alter the original confidence scores based on the first domain being invoked to cause the system to output content while the current user input was received. Based on the first domain being invoked, the shortlister component 1150 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1215 generated by the shortlister component 1150 as well as the different types of other data 1220 considered by the shortlister component 1150 are configurable. For example, the shortlister component 1150 may update confidence scores as more other data 1220 is considered. For further example, the n-best list data 1215 may exclude relevant domains if thresholding is implemented. Thus, for example, the shortlister component 1150 may include an indication of a domain in the n-best list data 1215 unless the shortlister component 1150 is one hundred percent confident that the domain may not execute the user input represented in the ASR output data 412 (e.g., the shortlister component 1150 determines a confidence score of zero for the domain).

The shortlister component 1150 may send the ASR output data 412 to recognizers 1163 associated with domains represented in the n-best list data 1215. Alternatively, the shortlister component 1150 may send the n-best list data 1215 or some other indicator of the selected subset of domains to another component (such as the orchestrator component 330) which may in turn send the ASR output data 412 to the recognizers 1163 corresponding to the domains included in the n-best list data 1215 or otherwise indicated in the indicator. If the shortlister component 1150 generates an n-best list representing domains without any associated confidence scores, the shortlister component 1150/orchestrator component 330 may send the ASR output data 412 to recognizers 1163 associated with domains that the shortlister component 1150 determines may execute the user input. If the shortlister component 1150 generates an n-best list representing domains with associated confidence scores, the shortlister component 1150/orchestrator component 330 may send the ASR output data 412 to recognizers 1163 associated with domains associated with confidence scores satisfying (e.g., meeting or exceeding) a threshold minimum confidence score.

A recognizer 1163 may output tagged text data generated by an NER component 1162 and an IC component 1164, as described herein above. The NLU component 360/460 may compile the output tagged text data of the recognizers 1163 into a single cross-domain n-best list data 1240 and may send the cross-domain n-best list data 1240 to a pruning component 1250. Each entry of tagged text (e.g., each NLU hypothesis) represented in the cross-domain n-best list data 1240 may be associated with a respective score indicating a likelihood that the NLU hypothesis corresponds to the domain associated with the recognizer 1163 from which the NLU hypothesis was output. For example, the cross-domain n-best list data 1240 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1250 may sort the NLU hypotheses represented in the cross-domain n-best list data 1240 according to their respective scores. The pruning component 1250 may perform score thresholding with respect to the cross-domain NLU hypotheses. For example, the pruning component 1250 may select NLU hypotheses associated with scores satisfying (e.g., meeting and/or exceeding) a threshold score. The pruning component 1250 may also or alternatively perform number of NLU hypothesis thresholding. For example, the pruning component 1250 may select the top scoring NLU hypothesis(es). The pruning component 1250 may output a portion of the NLU hypotheses input thereto. The purpose of the pruning component 1250 is to create a reduced list of NLU hypotheses so that downstream, more resource intensive, processes may only operate on the NLU hypotheses that most likely represent the user's intent.

The NLU component 360/460 may include a light slot filler component 1252. The light slot filler component 1252 can take text from slots represented in the NLU hypotheses output by the pruning component 1250 and alter them to make the text more easily processed by downstream components. The light slot filler component 1252 may perform low latency operations that do not involve heavy operations such as reference to a knowledge base (e.g., 1172. The purpose of the light slot filler component 1252 is to replace words with other words or values that may be more easily understood by downstream components. For example, if a NLU hypothesis includes the word "tomorrow," the light slot filler component 1252 may replace the word "tomorrow" with an actual date for purposes of downstream processing. Similarly, the light slot filler component 1252 may replace the word "CD" with "album" or the words "compact disc." The replaced words are then included in the cross-domain n-best list data 1260.

The cross-domain n-best list data 1260 may be input to an entity resolution component 1270. The entity resolution component 1270 can apply rules or other instructions to standardize labels or tokens from previous stages into an intent/slot representation. The precise transformation may depend on the domain. For example, for a travel domain, the entity resolution component 1270 may transform text corresponding to "Boston airport" to the standard BOS three-letter code referring to the airport. The entity resolution component 1270 can refer to a knowledge base (e.g., 1172) that is used to specifically identify the precise entity referred to in each slot of each NLU hypothesis represented in the cross-domain n-best list data 1260. Specific intent/slot combinations may also be tied to a particular source, which may then be used to resolve the text. In the example "play songs by the stones," the entity resolution component 1270 may reference a personal music catalog, Amazon Music account, a user profile, or the like. The entity resolution component 1270 may output an altered n-best list that is based on the cross-domain n-best list data 1260 but that includes more detailed information (e.g., entity IDs) about the specific entities mentioned in the slots and/or more detailed slot data that can eventually be used by a skill. The NLU component 360/460 may include multiple entity resolution components 1270 and each entity resolution component 1270 may be specific to one or more domains.

The NLU component 360/460 may include a reranker 1290. The reranker 1290 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1270.

The reranker 1290 may apply re-scoring, biasing, or other techniques. The reranker 1290 may consider not only the data output by the entity resolution component 1270, but may also consider other data 1291. The other data 1291 may include a variety of information. For example, the other data 1291 may include skill rating or popularity data. For example, if one skill has a high rating, the reranker 1290 may increase the score of a NLU hypothesis that may be processed by the skill. The other data 1291 may also include information about skills that have been enabled by the user that originated the user input. For example, the reranker 1290 may assign higher scores to NLU hypothesis that may be processed by enabled skills than NLU hypothesis that may be processed by non-enabled skills. The other data 1291 may also include data indicating user usage history, such as if the user that originated the user input regularly uses a particular skill or does so at particular times of day. The other data 1291 may additionally include data indicating date, time, location, weather, type of device 110, user identifier, context, as well as other information. For example, the reranker 1290 may consider when any particular skill is currently active (e.g., music being played, a game being played, etc.).

As illustrated and described, the entity resolution component 1270 is implemented prior to the reranker 1290. The entity resolution component 1270 may alternatively be implemented after the reranker 1290. Implementing the entity resolution component 1270 after the reranker 1290 limits the NLU hypotheses processed by the entity resolution component 1270 to only those hypotheses that successfully pass through the reranker 1290.

The reranker 1290 may be a global reranker (e.g., one that is not specific to any particular domain). Alternatively, the NLU component 360/460 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 360/460 may perform NLU processing described above with respect to domains associated with skills wholly implemented as part of the system(s) 120 (e.g., designated 180 and/or 190 in FIGS. 1 and 3). The NLU component 360/460 may separately perform NLU processing described above with respect to domains associated with skills that are at least partially implemented as part of the skill support system(s) 325. In an example, the shortlister component 1150 may only process with respect to these latter domains. Results of these two NLU processing paths may be merged into NLU results data 1285, which may be sent to a post-NLU ranker 1265, which may be implemented by the system(s) 120.

The post-NLU ranker 1265 may include a statistical component that produces a ranked list of intent/skill pairs with associated confidence scores. Each confidence score may indicate an adequacy of the skill's execution of the intent with respect to NLU results data associated with the skill. The post-NLU ranker 1265 may operate one or more trained models configured to process the NLU results data 1285, skill result data 1230, and the other data 1220 in order to output ranked output data 1225. The ranked output data 1225 may include an n-best list where the NLU hypotheses in the NLU results data 1285 are reordered such that the n-best list in the ranked output data 1225 represents a prioritized list of skills to respond to a user input as determined by the post-NLU ranker 1265. The ranked output data 1225 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1265 enables the system to better determine the best skill to execute the user input. For example, first and second NLU hypotheses in the NLU results data 1285 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1265 (or other scheduling component such as orchestrator component 330) may solicit the first skill and the second skill to provide potential result data 1230 based on the first NLU hypothesis and the second NLU hypothesis, respectively. For example, the post-NLU ranker 1265 may send the first NLU hypothesis to the first skill 180*a*/190*a* along with a request for the first skill 180*a*/190*a* to at least partially execute with respect to the first NLU hypothesis. The post-NLU ranker 1265 may also send the second NLU hypothesis to the second skill 180*b*/190*b* along with a request for the second skill 180*b*/190*b* to at least partially execute with respect to the second NLU hypothesis. The post-NLU ranker 1265 receives, from the first skill 180*a*/190*a*, first result data 1230*a* generated from the first skill 180*a*/190*a*'s execution with respect to the first NLU hypothesis. The post-NLU ranker 1265 also receives, from the second skill 180*b*/190*b*, second results data 1230*b* generated from the second skill 180*b*/190*b*'s execution with respect to the second NLU hypothesis.

The result data 1230 may include various portions. For example, the result data 1230 may include content (e.g., audio data, text data, and/or video data) to be output to a user. The result data 1230 may also include a unique identifier used by the system(s) 120 and/or the skill support system(s) 325 to locate the data to be output to a user. The result data 1230 may also include an instruction. For example, if the user input corresponds to "turn on the light," the result data 1230 may include an instruction causing the system to turn on a light associated with a profile of the device (110*a*/110*b*) and/or user.

The post-NLU ranker 1265 may consider the first result data 1230*a* and the second result data 1230*b* to alter the first confidence score and the second confidence score of the first NLU hypothesis and the second NLU hypothesis, respectively. That is, the post-NLU ranker 1265 may generate a third confidence score based on the first result data 1230*a* and the first confidence score. The third confidence score may correspond to how likely the post-NLU ranker 1265 determines the first skill will correctly respond to the user input. The post-NLU ranker 1265 may also generate a fourth confidence score based on the second result data 1230*b* and the second confidence score. One skilled in the art will appreciate that a first difference between the third confidence score and the fourth confidence score may be greater than a second difference between the first confidence score and the second confidence score. The post-NLU ranker 1265 may also consider the other data 1220 to generate the third confidence score and the fourth confidence score. While it has been described that the post-NLU ranker 1265 may alter the confidence scores associated with first and second NLU hypotheses, one skilled in the art will appreciate that the post-NLU ranker 1265 may alter the confidence scores of more than two NLU hypotheses. The post-NLU ranker 1265 may select the result data 1230 associated with the skill 180/190 with the highest altered confidence score to be the data output in response to the current user input. The post-NLU ranker 1265 may also consider the ASR output data 412 to alter the NLU hypotheses confidence scores.

The orchestrator component 330 may, prior to sending the NLU results data 1285 to the post-NLU ranker 1265, associate intents in the NLU hypotheses with skills 180/190. For example, if a NLU hypothesis includes a <PlayMusic> intent, the orchestrator component 330 may associate the NLU hypothesis with one or more skills 180/190 that can execute the <PlayMusic> intent. Thus, the orchestrator component 330 may send the NLU results data 1285, including NLU hypotheses paired with skills 180/190, to the post-NLU ranker 1265. In response to ASR output data 412 corresponding to "what should I do for dinner today," the orchestrator component 330 may generates pairs of skills 180/190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 1265 queries each skill 180/190, paired with a NLU hypothesis in the NLU results data 1285, to provide result data 1230 based on the NLU hypothesis with which it is associated. That is, with respect to each skill, the post-NLU ranker 1265 colloquially asks the each skill "if given this NLU hypothesis, what would you do with it." According to the above example, the post-NLU ranker 1265 may send skills 180/190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 1265 may query each of the skills 180/190 in parallel or substantially in parallel.

A skill 180/190 may provide the post-NLU ranker 1265 with various data and indications in response to the post-NLU ranker 1265 soliciting the skill 180/190 for result data 1230. A skill 180/190 may simply provide the post-NLU ranker 1265 with an indication of whether or not the skill can execute with respect to the NLU hypothesis it received. A skill 180/190 may also or alternatively provide the post-NLU ranker 1265 with output data generated based on the NLU hypothesis it received. In some situations, a skill 180/190 may need further information in addition to what is represented in the received NLU hypothesis to provide output data responsive to the user input. In these situations, the skill 180/190 may provide the post-NLU ranker 1265 with result data 1230 indicating slots of a framework that the skill 180/190 further needs filled or entities that the skill 180/190 further needs resolved prior to the skill 180/190 being able to provided result data 1230 responsive to the user input. The skill 180/190 may also provide the post-NLU ranker 1265 with an instruction and/or computer-generated speech indicating how the skill 180/190 recommends the system solicit further information needed by the skill 180/190. The skill 180/190 may further provide the post-NLU ranker 1265 with an indication of whether the skill 180/190 will have all needed information after the user provides additional information a single time, or whether the skill 180/190 will need the user to provide various kinds of additional information prior to the skill 180/190 having all needed information. According to the above example, skills 180/190 may provide the post-NLU ranker 1265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 1230 includes an indication provided by a skill 180/190 indicating whether or not the skill 180/190 can execute with respect to a NLU hypothesis; data generated by a skill 180/190 based on a NLU hypothesis; as well as an indication provided by a skill 180/190 indicating the skill 180/190 needs further information in addition to what is represented in the received NLU hypothesis.

The post-NLU ranker 1265 uses the result data 1230 provided by the skills 180/190 to alter the NLU processing confidence scores generated by the reranker 1290. That is, the post-NLU ranker 1265 uses the result data 1230 provided by the queried skills 180/190 to create larger differences between the NLU processing confidence scores generated by the reranker 1290. Without the post-NLU ranker 1265, the system may not be confident enough to determine an output in response to a user input, for example when the NLU hypotheses associated with multiple skills are too close for the system to confidently determine a single skill 180/190 to invoke to respond to the user input. For example, if the system does not implement the post-NLU ranker 1265, the system may not be able to determine whether to obtain output data from a general reference information skill or a medical information skill in response to a user input corresponding to "what is acne."

The post-NLU ranker 1265 may prefer skills 180/190 that provide result data 1230 responsive to NLU hypotheses over skills 180/190 that provide result data 1230 corresponding to an indication that further information is needed, as well as skills 180/190 that provide result data 1230 indicating they can provide multiple responses to received NLU hypotheses. For example, the post-NLU ranker 1265 may generate a first score for a first skill 180*a*/190*a* that is greater than the first skill's NLU confidence score based on the first skill 180*a*/190*a* providing result data 1230*a* including a response to a NLU hypothesis. For further example, the post-NLU ranker 1265 may generate a second score for a second skill 180*b*/190*b* that is less than the second skill's NLU confidence score based on the second skill 180*b*/190*b* providing result data 1230*b* indicating further information is needed for the second skill 180*b*/190*b* to provide a response to a NLU hypothesis. Yet further, for example, the post-NLU ranker 1265 may generate a third score for a third skill 180*c*/190*c* that is less than the third skill's NLU confidence score based on the third skill 180*c*/190*c* providing result data 1230*c* indicating the third skill 180*c*/190*c* can provide multiple responses to a NLU hypothesis.

The post-NLU ranker 1265 may consider other data 1220 in determining scores. The other data 1220 may include rankings associated with the queried skills 180/190. A ranking may be a system ranking or a user-specific ranking. A ranking may indicate a veracity of a skill from the perspective of one or more users of the system. For example, the post-NLU ranker 1265 may generate a first score for a first skill 180*a*/190*a* that is greater than the first skill's NLU processing confidence score based on the first skill 180*a*/190*a* being associated with a high ranking. For further example, the post-NLU ranker 1265 may generate a second score for a second skill 180*b*/190*b* that is less than the second skill's NLU processing confidence score based on the second skill 180*b*/190*b* being associated with a low ranking.

The other data 1220 may include information indicating whether or not the user that originated the user input has enabled one or more of the queried skills 180/190. For example, the post-NLU ranker 1265 may generate a first score for a first skill 180*a*/190*a* that is greater than the first skill's NLU processing confidence score based on the first skill 180*a*/190*a* being enabled by the user that originated the user input. For further example, the post-NLU ranker 1265 may generate a second score for a second skill 180*b*/190*b* that is less than the second skill's NLU processing confidence score based on the second skill 180*b*/190*b* not being enabled by the user that originated the user input. When the post-NLU ranker 1265 receives the NLU results data 1285, the post-NLU ranker 1265 may determine whether profile data, associated with the user and/or device that originated the user input, includes indications of enabled skills.

The other data 1220 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1265 may increase the NLU processing confidence score associated with a first skill configured to output visual data and/or decrease the NLU processing confidence score associated with a second skill configured to output audio data.

The other data 1220 may include information indicating the veracity of the result data 1230 provided by a skill 180/190. For example, if a user says "tell me a recipe for pasta sauce," a first skill 180*a*/190*a* may provide the post-NLU ranker 1265 with first result data 1230*a* corresponding to a first recipe associated with a five star rating and a second skill 180*b*/190*b* may provide the post-NLU ranker 1265 with second result data 1230*b* corresponding to a second recipe associated with a one star rating. In this situation, the post-NLU ranker 1265 may increase the NLU processing confidence score associated with the first skill 180*a*/190*a* based on the first skill 180*a*/190*a* providing the first result data 1230*a* associated with the five star rating and/or decrease the NLU processing confidence score associated with the second skill 180*b*/190*b* based on the second skill 180*b*/190*b* providing the second result data 1230*b* associated with the one star rating.

The other data 1220 may include information indicating the type of device that originated the user input. For example, the device may correspond to a "hotel room" type if the device is located in a hotel room. If a user inputs a command corresponding to "order me food" to the device located in the hotel room, the post-NLU ranker 1265 may increase the NLU processing confidence score associated with a first skill 180*a*/190*a* corresponding to a room service skill associated with the hotel and/or decrease the NLU processing confidence score associated with a second skill 180*b*/190*b* corresponding to a food skill not associated with the hotel.

The other data 1220 may include information indicating a location of the device and/or user that originated the user input. The system may be configured with skills 180/190 that may only operate with respect to certain geographic locations. For example, a user may provide a user input corresponding to "when is the next train to Portland." A first skill 180*a*/190*a* may operate with respect to trains that arrive at, depart from, and pass through Portland, Oreg. A second skill 180*b*/190*b* may operate with respect to trains that arrive at, depart from, and pass through Portland, Me. If the device and/or user that originated the user input is located in Seattle, Wash., the post-NLU ranker 1265 may increase the NLU processing confidence score associated with the first skill 180*a*/190*a* and/or decrease the NLU processing confidence score associated with the second skill 180*b*/190*b*. Likewise, if the device and/or user that originated the user input is located in Boston, Mass., the post-NLU ranker 1265 may increase the NLU processing confidence score associated with the second skill 180*b*/190*b* and/or decrease the NLU processing confidence score associated with the first skill 180*a*/190*a*.

The other data 1220 may include information indicating a time of day. The system may be configured with skills 180/190 that operate with respect to certain times of day. For example, a user may provide a user input corresponding to "order me food." A first skill 180*a*/190*a* may generate first result data 1230*a* corresponding to breakfast. A second skill 180*b*/190*b* may generate second result data 1230*b* corresponding to dinner. If the system(s) 120 receives the user input in the morning, the post-NLU ranker 1265 may increase the NLU processing confidence score associated with the first skill 180*a*/190*a* and/or decrease the NLU processing score associated with the second skill 180*b*/190*b*. If the system(s) 120 receives the user input in the afternoon or evening, the post-NLU ranker 1265 may increase the NLU processing confidence score associated with the second skill 180*b*/190*b* and/or decrease the NLU processing confidence score associated with the first skill 180*a*/190*a*.

The other data 1220 may include information indicating user preferences. The system may include multiple skills 180/190 configured to execute in substantially the same manner. For example, a first skill 180*a*/190*a* and a second skill 180*b*/190*b* may both be configured to order food from respective restaurants. The system may store a user preference (e.g., in the profile storage 147/370) that is associated with the user that provided the user input to the system(s) 120 as well as indicates the user prefers the first skill 180*a*/190*a* over the second skill 180*b*/190*b*. Thus, when the user provides a user input that may be executed by both the first skill 180*a*/190*a* and the second skill 180*b*/190*b*, the post-NLU ranker 1265 may increase the NLU processing confidence score associated with the first skill 180*a*/190*a* and/or decrease the NLU processing confidence score associated with the second skill 180b/190b.

The other data 1220 may include information indicating system usage history associated with the user that originated the user input. For example, the system usage history may indicate the user originates user inputs that invoke a first skill 180a/190a more often than the user originates user inputs that invoke a second skill 180b/190b. Based on this, if the present user input may be executed by both the first skill 180a/190a and the second skill 180b/190b, the post-NLU ranker 1265 may increase the NLU processing confidence score associated with the first skill 180a/190a and/or decrease the NLU processing confidence score associated with the second skill 180b/190b.

The other data 1220 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 1265 may increase the NLU processing confidence score associated with a first skill 180a/190a that generates audio data. The post-NLU ranker 1265 may also or alternatively decrease the NLU processing confidence score associated with a second skill 180b/190b that generates image data or video data.

The other data 1220 may include information indicating how long it took a skill 180/190 to provide result data 1230 to the post-NLU ranker 1265. When the post-NLU ranker 1265 multiple skills 180/190 for result data 1230, the skills 180/190 may respond to the queries at different speeds. The post-NLU ranker 1265 may implement a latency budget. For example, if the post-NLU ranker 1265 determines a skill 180/190 responds to the post-NLU ranker 1265 within a threshold amount of time from receiving a query from the post-NLU ranker 1265, the post-NLU ranker 1265 may increase the NLU processing confidence score associated with the skill 180/190. Conversely, if the post-NLU ranker 1265 determines a skill 180/190 does not respond to the post-NLU ranker 1265 within a threshold amount of time from receiving a query from the post-NLU ranker 1265, the post-NLU ranker 1265 may decrease the NLU processing confidence score associated with the skill 180/190.

It has been described that the post-NLU ranker 1265 uses the other data 1220 to increase and decrease NLU processing confidence scores associated with various skills 180/190 that the post-NLU ranker 1265 has already requested result data from. Alternatively, the post-NLU ranker 1265 may use the other data 1220 to determine which skills 180/190 to request result data from. For example, the post-NLU ranker 1265 may use the other data 1220 to increase and/or decrease NLU processing confidence scores associated with skills 180/190 associated with the NLU results data 1285 output by the NLU component 360/460. The post-NLU ranker 1265 may select n-number of top scoring altered NLU processing confidence scores. The post-NLU ranker 1265 may then request result data 1230 from only the skills 180/190 associated with the selected n-number of NLU processing confidence scores.

As described, the post-NLU ranker 1265 may request result data 1230 from all skills 180/190 associated with the NLU results data 1285 output by the NLU component 360/460. Alternatively, the system(s) 120 may prefer result data 1230 from skills implemented entirely by the system(s) 120 rather than skills at least partially implemented by the skill support system(s) 325. Therefore, in the first instance, the post-NLU ranker 1265 may request result data 1230 from only skills associated with the NLU results data 1285 and entirely implemented by the system(s) 120. The post-NLU ranker 1265 may only request result data 1230 from skills associated with the NLU results data 1285, and at least partially implemented by the skill support system(s) 325, if none of the skills, wholly implemented by the system(s) 120, provide the post-NLU ranker 1265 with result data 1230 indicating either data response to the NLU results data 1285, an indication that the skill can execute the user input, or an indication that further information is needed.

As indicated above, the post-NLU ranker 1265 may request result data 1230 from multiple skills 180/190. If one of the skills 180/190 provides result data 1230 indicating a response to a NLU hypothesis and the other skills provide result data 1230 indicating either they cannot execute or they need further information, the post-NLU ranker 1265 may select the result data 1230 including the response to the NLU hypothesis as the data to be output to the user. If more than one of the skills 180/190 provides result data 1230 indicating responses to NLU hypotheses, the post-NLU ranker 1265 may consider the other data 1220 to generate altered NLU processing confidence scores, and select the result data 1230 of the skill associated with the greatest score as the data to be output to the user.

A system that does not implement the post-NLU ranker 1265 may select the highest scored NLU hypothesis in the NLU results data 1285. The system may send the NLU hypothesis to a skill 180/190 associated therewith along with a request for output data. In some situations, the skill 180/190 may not be able to provide the system with output data. This results in the system indicating to the user that the user input could not be processed even though another skill associated with lower ranked NLU hypothesis could have provided output data responsive to the user input.

The post-NLU ranker 1265 reduces instances of the aforementioned situation. As described, the post-NLU ranker 1265 queries multiple skills associated with the NLU results data 1285 to provide result data 1230 to the post-NLU ranker 1265 prior to the post-NLU ranker 1265 ultimately determining the skill 180/190 to be invoked to respond to the user input. Some of the skills 180/190 may provide result data 1230 indicating responses to NLU hypotheses while other skills 180/190 may providing result data 1230 indicating the skills cannot provide responsive data. Whereas a system not implementing the post-NLU ranker 1265 may select one of the skills 180/190 that could not provide a response, the post-NLU ranker 1265 only selects a skill 180/190 that provides the post-NLU ranker 1265 with result data corresponding to a response, indicating further information is needed, or indicating multiple responses can be generated.

The post-NLU ranker 1265 may select result data 1230, associated with the skill 180/190 associated with the highest score, for output to the user. Alternatively, the post-NLU ranker 1265 may output ranked output data 1225 indicating skills 180/190 and their respective post-NLU ranker rankings. Since the post-NLU ranker 1265 receives result data 1230, potentially corresponding to a response to the user input, from the skills 180/190 prior to post-NLU ranker 1265 selecting one of the skills or outputting the ranked output data 1225, little to no latency occurs from the time skills provide result data 1230 and the time the system outputs responds to the user.

If the post-NLU ranker 1265 selects result audio data to be output to a user and the system determines content should be output audibly, the post-NLU ranker 1265 (or another component of the system(s) 120) may cause the device 110*a* and/or the device 110*b* to output audio corresponding to the result audio data. If the post-NLU ranker 1265 selects result text data to output to a user and the system determines content should be output visually, the post-NLU ranker 1265 (or another component of the system(s) 120) may cause the device 110*b* to display text corresponding to the result text data. If the post-NLU ranker 1265 selects result audio data to output to a user and the system determines content should be output visually, the post-NLU ranker 1265 (or another component of the system(s) 120) may send the result audio data to the ASR component 135/156/350. The ASR component 135/156/350 may generate output text data corresponding to the result audio data. The system(s) 120 may then cause the device 110*b* to display text corresponding to the output text data. If the post-NLU ranker 1265 selects result text data to output to a user and the system determines content should be output audibly, the post-NLU ranker 1265 (or another component of the system(s) 120) may send the result text data to the TTS component 162/380. The TTS component 162/380 may generate output audio data (corresponding to computer-generated speech) based on the result text data. The system(s) 120 may then cause the device 110*a* and/or the device 110*b* to output audio corresponding to the output audio data.

As described, a skill 180/190 may provide result data 1230 either indicating a response to the user input, indicating more information is needed for the skill 180/190 to provide a response to the user input, or indicating the skill 180/190 cannot provide a response to the user input. If the skill 180/190 associated with the highest post-NLU ranker score provides the post-NLU ranker 1265 with result data 1230 indicating a response to the user input, the post-NLU ranker 1265 (or another component of the system(s) 120, such as the orchestrator component 330) may simply cause content corresponding to the result data 1230 to be output to the user. For example, the post-NLU ranker 1265 may send the result data 1230 to the orchestrator component 330. The orchestrator component 330 may cause the result data 1230 to be sent to the device (110*a*/110*b*), which may output audio and/or display text corresponding to the result data 1230. The orchestrator component 330 may send the result data 1230 to the ASR component 135/156/350 to generate output text data and/or may send the result data 1230 to the TTS component 162/380 to generate output audio data, depending on the situation.

The skill 180/190 associated with the highest post-NLU ranker score may provide the post-NLU ranker 1265 with result data 1230 indicating more information is needed as well as instruction data. The instruction data may indicate how the skill 180/190 recommends the system obtain the needed information. For example, the instruction data may correspond to text data or audio data (i.e., computer-generated speech) corresponding to "please indicate ." The instruction data may be in a format (e.g., text data or audio data) capable of being output by the device (110*a*/110*b*). When this occurs, the post-NLU ranker 1265 may simply cause the received instruction data be output by the device (110*a*/110*b*). Alternatively, the instruction data may be in a format that is not capable of being output by the device (110*a*/110*b*). When this occurs, the post-NLU ranker 1265 may cause the ASR component 135/156/350 or the TTS component 162/380 to process the instruction data, depending on the situation, to generate instruction data that may be output by the device (110*a*/110*b*). Once the user provides the system with all further information needed by the skill 180/190, the skill 180/190 may provide the system with result data 1230 indicating a response to the user input, which may be output by the system as detailed above.

The system may include "informational" skills 180/190 that simply provide the system with information, which the system outputs to the user. The system may also include "transactional" skills 180/190 that require a system instruction to execute the user input. Transactional skills 180/190 include ride sharing skills, flight booking skills, etc. A transactional skill 180/190 may simply provide the post-NLU ranker 1265 with result data 1230 indicating the transactional skill 180/190 can execute the user input. The post-NLU ranker 1265 may then cause the system to solicit the user for an indication that the system is permitted to cause the transactional skill 180/190 to execute the user input. The user-provided indication may be an audible indication or a tactile indication (e.g., activation of a virtual button or input of text via a virtual keyboard). In response to receiving the user-provided indication, the system may provide the transactional skill 180/190 with data corresponding to the indication. In response, the transactional skill 180/190 may execute the command (e.g., book a flight, book a train ticket, etc.). Thus, while the system may not further engage an informational skill 180/190 after the informational skill 180/190 provides the post-NLU ranker 1265 with result data 1230, the system may further engage a transactional skill 180/190 after the transactional skill 180/190 provides the post-NLU ranker 1265 with result data 1230 indicating the transactional skill 180/190 may execute the user input.

In some instances, the post-NLU ranker 1265 may generate respective scores for first and second skills that are too close (e.g., are not different by at least a threshold difference) for the post-NLU ranker 1265 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 330, post-NLU ranker 1265, short-lister component 1150, or other component may be trained and operated according to various machine learning techniques.

Figure 13:
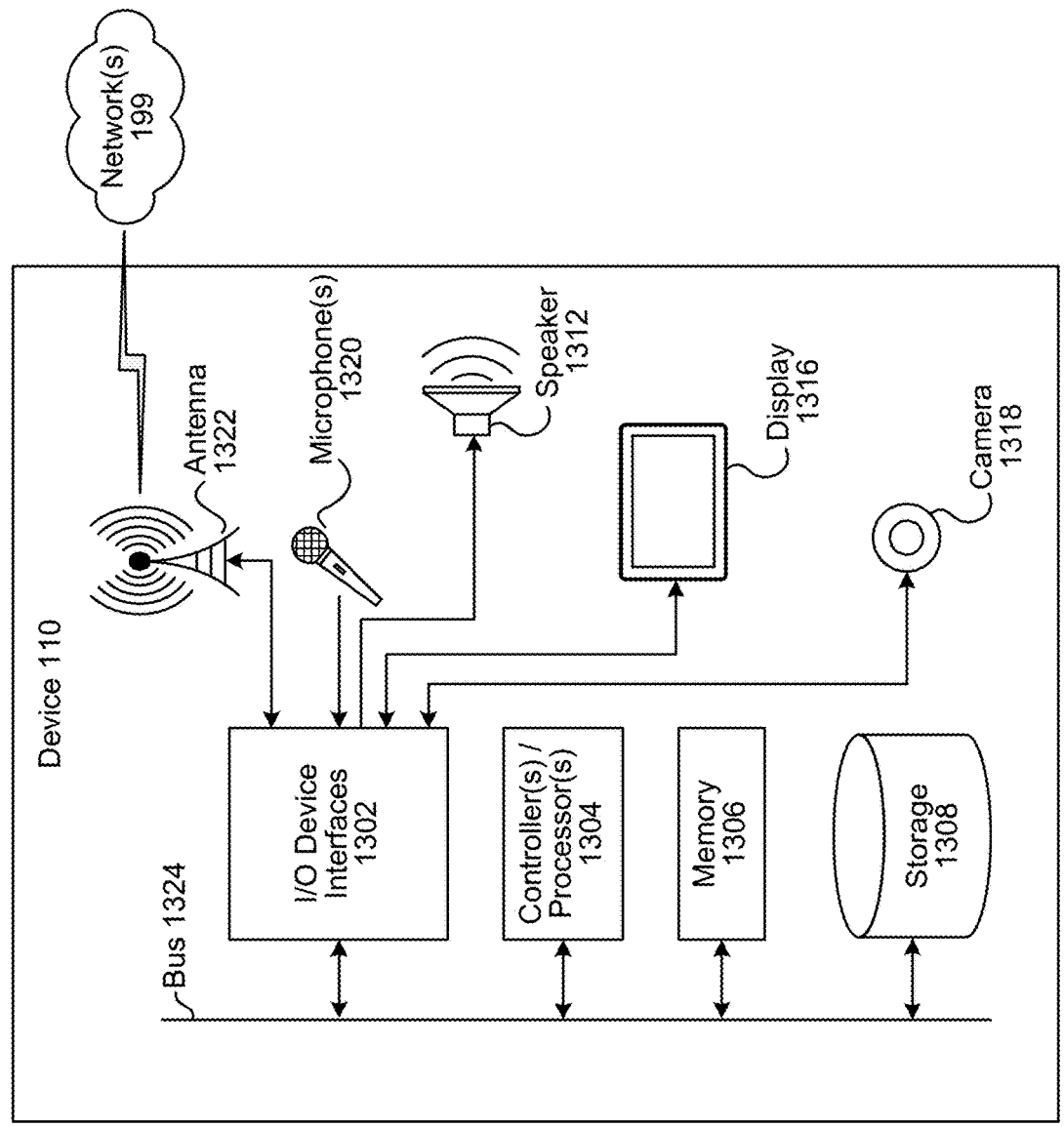
FIG. 13 is a block diagram conceptually illustrating example components of a device, according to embodiments of the present disclosure.

FIG. 13 is a block diagram conceptually illustrating a device 110 that may be used with the system. FIG. 14 is a block diagram conceptually illustrating example components of a remote device, such as the natural language command processing system 120, which may assist with ASR processing, NLU processing, etc., and a skill support system 325. A system (120/325) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/325) may be included in the overall system 100 of the present disclosure, such as one or more natural language processing systems 120 for performing ASR processing, one or more natural language processing systems 120 for performing NLU processing, one or more skill support systems 325, etc. In operation, each of these systems may include computer-readable and computer-executable instructions that reside on the respective device (120/325), as will be discussed further below.

Each of these devices (110/120/325) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/325) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (1302/1402).

Computer instructions for operating each device (110/120/325) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/325) includes input/output device interfaces (1302/1402). A variety of components may be connected through the input/output device interfaces (1302/1402), as will be discussed further below. Additionally, each device (110/120/325) may include an address/data bus (1324/1424) for conveying data among components of the respective device. Each component within a device (110/120/325) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system 120, or a skill support system 325 may include their own dedicated processors, memory, and/or storage. Alternatively, one or more of the components of the device(s) 110, the natural language command processing system 120, or a skill support system 325 may utilize the I/O interfaces (1302/1402), processor(s) (1304/1404), memory (1306/1406), and/or storage (1308/1408) of the device(s) 110, natural language command processing system 120, or the skill support system 325, respectively. Thus, the ASR component 135/156/350 may have its own I/O interface(s), processor(s), memory, and/or storage; the NLU component 360/460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill support system 325, as described herein, are illustrative, and may be located as a stand-alone device or may be included, in whole or in part, as a component of a larger device or system.

As illustrated in FIG. 15, multiple devices (110a-110n, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill support system(s) 325, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 135/156/350, the NLU component 360/460, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first portion of an utterance;
performing first automatic speech recognition (ASR) processing on the first audio data using a first ASR component of a first device to generate first lattice data representing a first possible transcription of the first portion of the utterance;
sending the first lattice data to a second device;
determining that the first audio data includes a representation of a wakeword originating from a media event;
sending, to the second device, characteristic data indicating that the representation of the wakeword was detected in the first audio data;
performing second ASR processing on the first lattice data using a second ASR component of the first device to determine an ASR hypothesis corresponding to the first portion of the utterance;
performing natural language understanding (NLU) processing on the ASR hypothesis to generate NLU results data including at least an intent;
sending a request for processing to a skill component of the first device based on the NLU results data;
receiving, from the skill component, a first directive corresponding to the NLU results data;
receiving, from the second device and in response to sending the first lattice data and the characteristic data, a second directive corresponding to the first audio data;
performing, by the first device, an action with respect to the first directive; and
in response to receiving the second directive after the first directive, suppressing the second directive.

2. The computer-implemented method of claim 1, further comprising:
receiving second audio data representing a second portion of the utterance;
performing third ASR processing on the first audio data and the second audio data using the first ASR component to generate second lattice data representing a second possible transcription of the first portion of the utterance and the second portion of the utterance, wherein a portion of the second lattice data represents a revision of the first lattice data;
sending the second lattice data to the second device; and
generating, by the second device the second directive based on the second lattice data.

3. A computer-implemented method comprising:
receiving first audio data representing a first portion of an utterance;
performing first automatic speech recognition (ASR) processing on the first audio data using a first ASR component of a first device to generate first data representing a possible transcription of the first portion of the utterance;
sending the first data to a second device;
processing the first audio data to identify one or more characteristics of the first audio data;
sending second data representing the one or more characteristics to the second device;
performing second ASR processing on the first data using a second ASR component of the second device to determine a first ASR hypothesis corresponding to the first portion of the utterance;

performing first natural language understanding (NLU) processing on the first ASR hypothesis using an NLU component of the second device to generate first NLU results data; and processing at least a portion of the first NLU results data using a skill component of the second device to perform a first action responsive to the first portion of the utterance.

4. The computer-implemented method of claim 3, wherein the first data includes first lattice data representing possible word sequences and probabilities identified in the first audio data.

5. The computer-implemented method of claim 4, further comprising:

receiving second audio data representing a second portion of the utterance;

performing third ASR processing on the first audio data and the second audio data using the first ASR component to generate second lattice data representing a second possible transcription of the first portion of the utterance and the second portion of the utterance, wherein a portion of the second lattice data represents a revision of the first lattice data; and sending the second lattice data to the second device, wherein performing the second ASR processing additionally includes processing the second lattice data.

6. The computer-implemented method of claim 3, wherein processing the first audio data includes one or more of determining a speaker identifier corresponding to a speaker of the utterance, performing whisper detection to determine that the first audio data includes whispered speech, or determining that the first audio data includes a representation of a wakeword originating from a media event.

7. The computer-implemented method of claim 3, further comprising:

performing third ASR processing on the first data using a third ASR component of the first device to determine a second ASR hypothesis corresponding to the first portion of the utterance;

performing second NLU processing on the second ASR hypothesis using an NLU component of the first device to generate second NLU results data;

processing at least a portion of the second NLU results data using a skill component of the first device to generate a first directive, wherein performing the first action includes sending, by the skill component of the second device to the first device, a second directive;

performing, by the first device, and action with respect to the first directive; and in response to receiving the second directive after generating the first directive, suppressing the second directive.

8. The computer-implemented method of claim 7, wherein the first device performs the third ASR processing using a first ASR model and the second device performs the second ASR processing using a second ASR model different from the first ASR model.

9. The computer-implemented method of claim 7, wherein:

processing the first audio data includes determining a speaker identifier corresponding to a speaker of the utterance, the second data represents the speaker identifier, and the second device performs the second ASR processing using an ASR model associated with the speaker identifier.

10. The computer-implemented method of claim 3, wherein the second device performs the second ASR processing and the first NLU processing without receiving the first audio data.

11. The computer-implemented method of claim 3, further comprising:

generating a first plurality of data packets representing the first data;

generating a second plurality of data packets representing the second data; and generating third data using the first plurality of data packets and the second plurality of data packets, wherein sending the first data and the second data to the second device includes sending the third data to the second device.

12. A first system, comprising:

at least one processor; and at least one memory comprising instructions that, when executed by the at least one processor, cause the first system to:

receive first audio data representing a first portion of an utterance;

perform first automatic speech recognition (ASR) processing on the first audio data using a first ASR component of a first device to generate first data representing a possible transcription of the first portion of the utterance;

send the first data to a second device;

process the first audio data to identify one or more characteristics of the first audio data;

send second data representing the one or more characteristics to the second device;

perform second ASR processing on the first data using a second ASR component of the second device to determine a first ASR hypothesis corresponding to the first portion of the utterance;

perform first natural language understanding (NLU) processing on the first ASR hypothesis using an NLU component of the second device to generate first NLU results data; and process at least a portion of the first NLU results data using a skill component of the second device to perform a first action responsive to the first portion of the utterance.

13. The first system of claim 12, wherein the first data includes first lattice data representing possible word sequences and probabilities identified in the first audio data.

14. The first system of claim 13, wherein the at least one memory further comprises instructions that, when executed by the at least one processor, further cause the first system to:

receive second audio data representing a second portion of the utterance;

perform third ASR processing on the first audio data and the second audio data using the first ASR component to generate second lattice data representing a second possible transcription of the first portion of the utterance and the second portion of the utterance, wherein a portion of the second lattice data represents a revision of the first lattice data; and send the second lattice data to the second device, wherein performing the second ASR processing additionally includes processing the second lattice data.

15. The first system of claim 12, wherein processing the first audio data includes one or more of determining a speaker identifier corresponding to a speaker of the utterance, performing whisper detection to determine that the first audio data includes whispered speech, or determining that the first audio data includes a representation of a wakeword originating from a media event.

16. The first system of claim 12, wherein the at least one memory further comprises instructions that, when executed by the at least one processor, further cause the first system to:
    perform third ASR processing on the first data using a third ASR component of the first device to determine a second ASR hypothesis corresponding to the first portion of the utterance;
    perform second NLU processing on the second ASR hypothesis using an NLU component of the first device to generate second NLU results data;
    process at least a portion of the second NLU results data using a skill component of the first device to generate a first directive, wherein performing the first action includes sending, by the skill component of the second device to the first device, a second directive;
    perform, by the first device, and action with respect to the first directive; and
    in response to receiving the second directive after generating the first directive, suppress the second directive.

17. The first system of claim 16, wherein the first device performs the third ASR processing using a first ASR model and the second device performs the second ASR processing using a second ASR model different from the first ASR model.

18. The first system of claim 16, wherein:
    process the first audio data includes determining a speaker identifier corresponding to a speaker of the utterance,
    the second data represents the speaker identifier, and
    the second device performs the second ASR processing using an ASR model associated with the speaker identifier.

19. The first system of claim 12, wherein the second device performs the second ASR processing and the first NLU processing without receiving the first audio data.

20. The first system of claim 12, wherein the at least one memory further comprises instructions that, when executed by the at least one processor, further cause the first system to:
    generate a first plurality of data packets representing the first data;
    generate a second plurality of data packets representing the second data; and
    generate third data using the first plurality of data packets and the second plurality of data packets, wherein sending the first data and the second data to the second device includes sending the third data to the second device.

* * * * *